(12) United States Patent
Fujikawa et al.

(10) Patent No.: US 7,834,805 B2
(45) Date of Patent: Nov. 16, 2010

(54) RADAR APPARATUS

(75) Inventors: Takumi Fujikawa, Nishinomiya (JP);
Takehiro Yamashita, Nishinomiya (JP);
Sae Takemoto (Shibata), Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 1098 days.

(21) Appl. No.: 10/569,944

(22) PCT Filed: Aug. 26, 2004

(86) PCT No.: PCT/JP2004/012668

§ 371 (c)(1),
(2), (4) Date: Feb. 28, 2006

(87) PCT Pub. No.: WO2005/022192

PCT Pub. Date: Mar. 10, 2005

(65) Prior Publication Data

US 2009/0121922 A1    May 14, 2009

(30) Foreign Application Priority Data

Aug. 29, 2003    (JP) ................ 2003-306967

(51) Int. Cl.
*G01S 7/04* (2006.01)
*G01S 13/00* (2006.01)

(52) U.S. Cl. ............... 342/179; 342/89; 342/91; 342/175; 342/176; 342/195

(58) Field of Classification Search ...... 342/25 R–25 F, 342/82–103, 118, 146, 147, 158, 175, 176, 342/179, 190–197, 185; 348/441, 442
See application file for complete search history.

(56) References Cited

U.S. PATENT DOCUMENTS

| 4,220,969 A | * | 9/1980 | Nitadori | 342/185 |
| 4,241,412 A | * | 12/1980 | Swain | 342/185 |
| 4,310,907 A | * | 1/1982 | Tachita et al. | 342/185 |
| 4,383,258 A | * | 5/1983 | Morin | 342/185 |
| 4,468,747 A | * | 8/1984 | Leavitt et al. | 348/441 |

(Continued)

FOREIGN PATENT DOCUMENTS

JP    57175972 A  *  10/1982    ............. 342/185

(Continued)

Primary Examiner—Bernarr E Gregory
(74) Attorney, Agent, or Firm—Birch, Stewart, Kolasch & Birch, LLP

(57) ABSTRACT

A radar apparatus in which an interpolated sweep between adjacent real sweeps is formed irrespective of an interval between the real sweeps, and image data corresponding to one cycle of sweeping can be certainly updated. A sweep azimuth generator (12) generates and outputs an azimuth of sweep interpolated between a current and previous real sweep azimuth based on the current and previous real sweep azimuths, to a draw address generator (7). A sweep data generator (11) performs linear interpolation based on solitariness removed data of current real sweep data read from a sweep memory (4), and the previous solitariness removed real sweep data stored therein to generate and output interpolated sweep data to an image memory (8). The image memory (8) stores the solitariness removed real sweep data or the interpolated sweep data based on the real and interpolated sweep azimuths from the draw address generator (7), and outputs them to a display (9).

6 Claims, 20 Drawing Sheets

U.S. PATENT DOCUMENTS

| | | | |
|---|---|---|---|
| 4,471,449 A * | 9/1984 | Leavitt et al. | 348/441 |
| 4,656,467 A * | 4/1987 | Strolle | 342/185 |
| 4,689,675 A * | 8/1987 | Tchorbajian et al. | 348/442 |
| 4,757,317 A * | 7/1988 | Henri et al. | 342/185 |
| 4,829,308 A * | 5/1989 | Tol et al. | 342/185 |
| 4,833,475 A * | 5/1989 | Pease et al. | 342/185 |
| 4,845,501 A * | 7/1989 | Pease et al. | 342/185 |
| 4,931,801 A * | 6/1990 | Hancock | 342/185 |
| 5,528,302 A * | 6/1996 | Basoglu et al. | 348/442 |
| 5,860,925 A * | 1/1999 | Liu | 348/442 |
| 6,198,429 B1 * | 3/2001 | Fujikawa et al. | 342/176 |
| 6,621,451 B1 * | 9/2003 | Fisher et al. | 342/185 |

FOREIGN PATENT DOCUMENTS

| | | | |
|---|---|---|---|
| JP | 62-129036 | 6/1987 | |
| JP | 62278475 A * | 12/1987 | 342/185 |
| JP | 02162282 A * | 6/1990 | 342/185 |
| JP | 5-45443 A | 2/1993 | |
| JP | 2639595 B2 | 5/1997 | |
| JP | 9-211105 A | 8/1997 | |
| JP | 2000-147088 A | 5/2000 | |
| JP | 2001-183462 A | 7/2001 | |
| JP | 3256655 B2 | 11/2001 | |
| WO | WO-02/12915 A1 | 2/2002 | |

* cited by examiner

Fig. 8 (a)  Fig. 8 (b)  Fig. 8 (c)
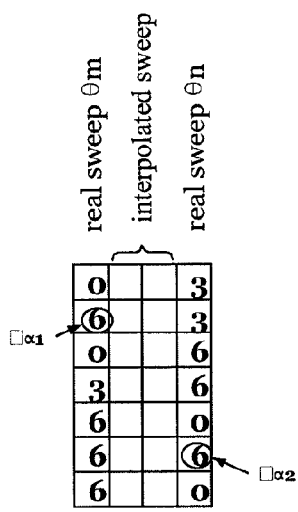
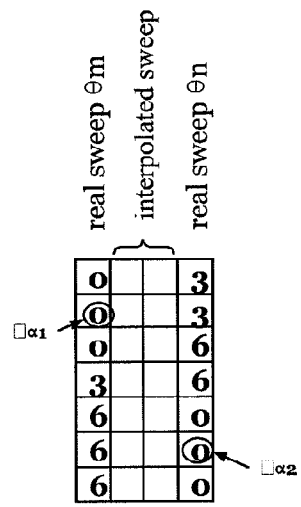
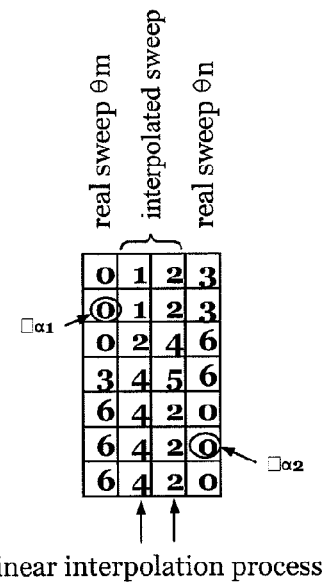
linear interpolation process thick-line arrow: real sweep
thin-line arrow: interpolated sweep thick-line arrow: real sweep
thin-line arrow: interpolated sweep
hatched portion: non-updated data portion

RADAR APPARATUS

TECHNICAL FIELD

The present invention relates to a radar apparatus which forms and displays detection image data for all azimuths based on a detection signal received by an antenna.

BACKGROUND ART

A radar apparatus for ships transmits radio waves from a radar antenna, forms sweep data in a polar coordinate system from a detection signal reflected on an object, transforms the data into a rectangular coordinate system and stores the resultant data into an image memory, and displays the data on a display using a raster scanning method.

Such a conventional radar apparatus will be described with reference to the accompanying drawings.

FIG. 14 is a block diagram illustrating a structure of a major portion of the conventional radar apparatus.

An antenna 1 transmits pulses of radio waves to the outside in predetermined transmission cycles, and receives radio waves reflected from objects in a polar coordinate system and outputs a received signal to a receiver 2, while rotating on a horizontal plane in predetermined rotation cycles. The antenna 1 also outputs to an adder 5 an antenna relative azimuth θa where the ship's head is a reference. The receiver 2 detects and amplifies a received signal from the antenna 1, and outputs a resultant signal to an AD converter 3. The AD converter 3 converts this analog received signal into a digital signal (received data) composed of a plurality of bits. First and second sweep memories 4a and 4b each store the digital received data corresponding to one sweep in real time, and outputs the one-sweep data to an image memory 8 by the time when received data obtained by the next transmission is written again.

The adder 5 adds the antenna relative azimuth θa input from the antenna 1 with a ship's head θc measured with a compass 20 to calculate a north-up display sweep azimuth θ=θa+θc and outputs it to a latch circuit 6. Note that, in the case of north-up display, the addition is performed in the adder 5, however, in the case of head-up display, the addition is not performed, and the antenna relative azimuth θa is directly input from the antenna 1 to the latch circuit 6. The latch circuit 6 latches the input sweep azimuth θ simultaneously with the start of sweep to prevent the sweep azimuth from changing during the time when received data (real sweep data) is read from the first and second sweep memories 4a and 4b and is then written into the image memory 8.

A draw address generator 7 creates addresses which designate pixels in the image memory 8 arranged in a corresponding rectangular coordinate system based on a sweep azimuth θ directing outward from a center of sweep and a read position r in the first and second sweep memories 4a and 4b, where the center of sweep is a start address. Specifically, the draw address generator 7 is composed of hardware which realizes the following expressions.

$X = Xs + r \cdot \sin\theta$ $Y = Ys + r \cdot \cos\theta$

X, Y: addresses designating a pixel in an image memory
Xs, Ys: addresses of the center of sweep
r: distance from the center
θ: sweep azimuth A draw timing generator 10 generates a control signal required for drawing, and outputs the signal to the sweep memory 4, the latch circuit 6, the draw address generator 7, and the image memory 8.

The image memory 8 has a capacity which stores received data corresponding to one cycle of sweeping, as image data. When a display 9 is subjected to raster scanning, the image data is read from the image memory 8 by a display control section (not shown) and is output to the display 9, in synchronization with raster scanning. In this case, if intensity or displayed color is caused to vary depending on the data value of each piece of pixel data in the image data, the operator can confirm circumstances, such as objects around his/her own ship, and the like (see, for example, Patent Document 1).

Patent Document 1: JP 2000-147088A

In such a conventional radar apparatus, in order to prevent coexistence of image data obtained in a current cycle of sweeping and image data obtained in the previous cycle of sweeping, the image data of the image memory 8 needs to be updated every cycle of sweeping.

The rotational speed of sweep, i.e., the rotational speed of the antenna, is typically 12 rpm to 60 rpm. However, the rotational speed may be changed due to, for example, air resistance caused by wind even during one revolution of the antenna 1. On the other hand, the transmission frequency (transmission repetition frequency) of radio waves is typically in the range of several hundreds of kilohertz to several thousands of kilohertz, and is fixed to a predetermined frequency which is mainly set based on a detection range (detection distance). The frequency is set to be high within a short-distance detection range, and is set to be low within a long-distance detection range.

The density of sweep data with respect to one pixel of the image memory 8 is decreased with a distance from the center. Therefore, when only sweep data obtained by a single time of transmission of radio waves is written into the image memory 8, and the rotational speed of the antenna is fast and the transmission frequency is low, pixel data in the vicinity of the center can be updated, but pixel data far in a distance direction cannot be updated. As a result, all pixel data in the image memory cannot be updated during one revolution of the antenna.

Therefore, as illustrated in a timing chart of FIG. 15, a larger number of sweeps than the number of times of transmission are successively generated to draw the image memory. Specifically, the updating of the image memory is performed by determining a sweep direction based on a current antenna azimuth or a sum azimuth of an antenna azimuth and a compass azimuth, irrespective of updating of the sweep memory due to transmission, and writing the contents of the sweep memory into the image memory. Typically, a time required to draw data corresponding to one sweep is caused to be sufficiently shorter than the transmission cycle. If writing of a certain sweep azimuth is ended, a current sweep azimuth is determined again and the image memory is updated. Such an operation is repeatedly performed.

Specifically, sweep data obtained directly from a received signal (hereinafter referred to as "real sweep data") and sweep data interpolated between adjacent pieces of real sweep data (hereinafter referred to as "interpolated sweep data") are used to update each pixel data in the image memory 8. In this case, the interpolated sweep data is obtained using the same data as real sweep data stored in the sweep memory 4 immediately before.

In the case where north-up display having stable azimuths is performed in such a radar apparatus, if the course of the ship is suddenly changed, the change amount of the ship's head θc detected by the compass increases, so that an angle between real sweeps becomes so large that an interpolated sweep cannot be formed. FIG. 15 is a timing chart of a conventional radar apparatus, in which a sweep azimuth θn+1 is followed by θn+3, so that an interpolated sweep having a sweep azimuth θn+2 cannot be generated. For example, such a change in the ship's head θc occurs when a small ship is hit by a wave under foul weather.

The ship's head θc, which is analog data, is typically input to an adder after being converted into digital data. However, when this conversion cycle takes a long time, an interval between consecutive ship's heads θc becomes large, i.e., an interval between real sweeps becomes large.

When the interval between real sweeps required to update the image memory becomes large during one cycle of sweeping as described above, it is not possible to form all interpolated sweeps. FIG. 16 is a sweep configuration diagram of image data. In FIG. 16, a thick-line arrow indicates a real sweep, a thin-line arrow indicates an interpolated sweep, and a hatched portion indicates a region in which no sweep is formed. As illustrated in FIG. 16, a portion of sweep data is not updated in the above-described situation, so that image data obtained in the previous cycle of sweeping remains.

In addition, in the case of the above-described conventional radar apparatus, real sweep data and interpolated sweep data based on the real sweep data have the same data value, and therefore, as illustrated in Table 1, data values change suddenly.

TABLE 1

| sweep type | sweep azimuth (angle) | sweep data |
| --- | --- | --- |
| real sweep | θn | B |
| interpolated sweep | θn + 1 | B |
| real sweep | θn + 3 | C |
| interpolated sweep | θn + 4 | C |
| real sweep | θn + 5 | C |
| interpolated sweep | θn + 6 | D |

For example, if "B=6" and "C=0", sweep data suddenly changes from "6" to "0" at a position where the azimuth changes from θn+1 to θn+3.

In FIGS. 17(*a*)-(*d*), FIG. 17(*a*) is an image data configuration diagram in which only real sweep data is represented by numerical values, and FIG. 17(*b*) is an image configuration diagram in which intensity is changed based on the numerical values of FIG. 17(*a*). FIG. 17(*c*) is an image data configuration diagram in which each pixel data in the image memory 8 of the conventional example is represented by numerical values, and FIG. 17(*d*) is an image configuration diagram in which intensity is changed based on the numerical values of FIG. 17(*c*).

For example, as illustrated in an A portion of FIG. 17, when a real sweep θm is "6" and a real sweep θn is "0", all interpolated sweeps therebetween are "6". Therefore, pixel data values suddenly change from "6" to "0" between the interpolated sweep and the real sweep θn, so that a video in which an end portion of an image is suddenly cut is displayed.

As another example, in FIGS. 18(*a*)-(*d*), FIG. 18(*a*) is an image data configuration diagram when only real sweep data is represented by numerical values, and FIG. 18(*b*) is an image configuration diagram in which intensity is changed based on the numerical values of FIG. 18(*a*). FIG. 18(*c*) is an image data configuration diagram in which each pixel data in the image memory 8 of the conventional example is represented by numerical values, and FIG. 18(*d*) is an image configuration diagram in which intensity is changed based on the numerical values of FIG. 18(*c*). Note that, also in FIGS. 18(*a*)-(*d*), a higher density of a pixel indicates a higher intensity of the pixel.

As illustrated in FIG. 18, when noise-like image data which is discontinuously present in the distance direction is present in real sweep data, interpolated sweep data following this also becomes the same image data, so that noise is emphasized in the azimuth direction.

In addition, when noise is present at the same position in the distance direction of consecutive real sweeps, noise is further emphasized in the azimuth direction, so that arc-like images are randomly displayed on the display. Particularly, when a gain is increased, it is more likely that noise is present at the same position in the distance direction of real sweeps adjacent in the azimuth direction, so that random arc-like images are likely to be displayed. In addition, a distance in the azimuth direction between sweeps increases with a distance from the center, and therefore, an arc-like image is likely to be more emphasized at a position more distant from the center, so that an unnatural image is likely to be displayed.

In recent years, there has been a demand for a shorter rotation cycle of an antenna in order to detect a high-speed ship. However, there is an upper limit on the transmission frequency of radio waves because of characteristics of the radio wave transmission section. Therefore, the rotation cycle of the antenna is only reduced, but the transmission frequency of radio waves does not change, so that an angle between real sweeps increases, and therefore, an arc-like image is displayed more noticeably.

An object of the present invention is to provide a radar apparatus which can certainly update image data corresponding to one cycle of sweeping by forming an interpolated sweep between adjacent real sweeps irrespective of an interval between the real sweeps.

Another object of the present invention is to provide a radar apparatus with excellent viewability in which noise is not emphasized and an image of an end of an object does not suddenly change.

DISCLOSURE OF INVENTION

The present invention provides a radar apparatus for forming detection image data from real sweep data successively formed based on a detection signal received by an antenna, and interpolated sweep data that is interpolated between adjacent pieces of the real sweep data in an azimuth direction, the device comprising interpolated sweep azimuth calculator for calculating a sweep azimuth of an interpolated sweep between a current real sweep and the previous real sweep based on a sweep azimuth of the current real sweep and a sweep azimuth of the previous real sweep, and sweep data former for calculating interpolated sweep data between current real sweep data and the previous real sweep data based on the current real sweep data and the previous real sweep data, wherein sweep data is formed based on the calculated interpolated sweep data and the real sweep data.

According to this feature, a sweep azimuth of interpolated sweep data between current real sweep data and the previous real sweep data is calculated from a time when the current real sweep data is input, and interpolated sweep data is generated for each sweep azimuth. Therefore, even when an angle changes between real sweeps, an optimal number of pieces of interpolated sweep data and optimal azimuths thereof are formed, depending on an interval between adjacent real sweep azimuths.

In this invention, the interpolated sweep data is composed of a linearly interpolated value between the previous real sweep data and the current real sweep data present on the same position in a sweep distance direction.

According to this feature, interpolated sweep data is a linearly interpolated value(s) for two adjacent pieces of real sweep data. Therefore, for example, when one of the pieces of real sweep data is "6" and the other is "3" and the number of interpolated sweeps formed between these real sweeps is two, interpolated sweep data closer to the real sweep data "6" is "5" and interpolated sweep data closer to real sweep data "3" is "4". Therefore, when intensity is set and displayed, depending on these numerical values, a change from intensity corresponding to the numerical value "6" to intensity corresponding to the numerical value "3" is not sudden, i.e., interpolated sweep data is displayed with intensity corresponding to the intermediate values "5" and "4". Thus, a difference in intensity between adjacent pieces of real sweep data is small, so that intensity is changed in a fine stepwise manner.

In this invention, the sweep data former comprises corrected real sweep data former for, when, among a plurality of pieces of data of the real sweep data arranged in a distance direction, solitary data having a value larger than or equal to a predetermined threshold value is present in a predetermined range, converting the solitary data into corrected real sweep data, and corrected interpolated sweep data calculator for calculating corrected interpolated sweep data based on the corrected real sweep data formed by the corrected real sweep data former, and forms the sweep data based on the corrected real sweep data and the corrected interpolated sweep data.

The present invention also provides a radar apparatus for forming detection image data from real sweep data successively formed based on a detection signal received by an antenna, and interpolated sweep data that is interpolated between adjacent pieces of the real sweep data in an azimuth direction, the device comprising corrected real sweep data former for, when, among a plurality of pieces of data of the real sweep data arranged in a distance direction, solitary data having a value larger than or equal to a predetermined threshold value is present in a predetermined range, converting the solitary data into corrected real sweep data, and corrected interpolated sweep data calculator for calculating corrected interpolated sweep data based on the corrected real sweep data formed by the corrected real sweep data former, wherein sweep data is formed based on the corrected real sweep data and the corrected interpolated sweep data.

According to these features, data discontinuous in the distance direction, such as noise, is caused to be equal to one of adjacent pieces of real sweep data in the sweep distance direction which is the smaller, thereby correcting discontinuous and noticeable sweep data to suppress an influence of real sweep data noise. Further, interpolated sweep data between the corrected real sweep data and pieces of real sweep data adjacent thereto is calculated based on the real sweep data, but not real sweep data containing discontinuous data, thereby suppressing an influence of noise on the interpolated sweep data. For example, when data discontinuous in the distance direction is "6" and both pieces of real sweep data adjacent thereto in the distance direction are "0", this real sweep data is connected to be "0". If data at the same position in the distance direction of a real sweep adjacent to this real sweep is "0", data at the same position in the distance direction of interpolated sweep data therebetween is "0". Thereby, an influence of data (noise) discontinuous in the distance direction on interpolated sweep data is prevented, thereby avoiding display of a noise image which is unnecessarily emphasized.

According to the present invention, an optimal number of pieces of interval interpolated sweep data are formed, depending on an interval between adjacent pieces of real sweep data, thereby certainly updating and displaying detection image data corresponding to one cycle of sweeping.

According to the present invention, interpolated sweep data is a linearly interpolated value(s) between two adjacent pieces of real sweep data. Therefore, even when adjacent real sweep portions in a detection image has a difference in intensity, the intensity does not change suddenly, and is changed and displayed in a stepwise manner. Thereby, an image viewable for the operator can be displayed.

According to the present invention, data discontinuous in the sweep distance direction is not reflected on calculation of interpolated sweep data, whereby detection image data in which noise is unnecessarily emphasized is not formed.

BRIEF DESCRIPTION OF DRAWINGS

FIG. 8(a) is a data configuration diagram illustrating details of a solitariness removing process.

FIG. 8(b) is a data configuration diagram illustrating details of a solitariness removing process.

FIG. 8(c) is a data configuration diagram illustrating details of a solitariness removing process.

DESCRIPTION OF THE INVENTION

A radar apparatus according to an embodiment of the present invention will be described with reference to the accompanying drawings.

Figure 1:
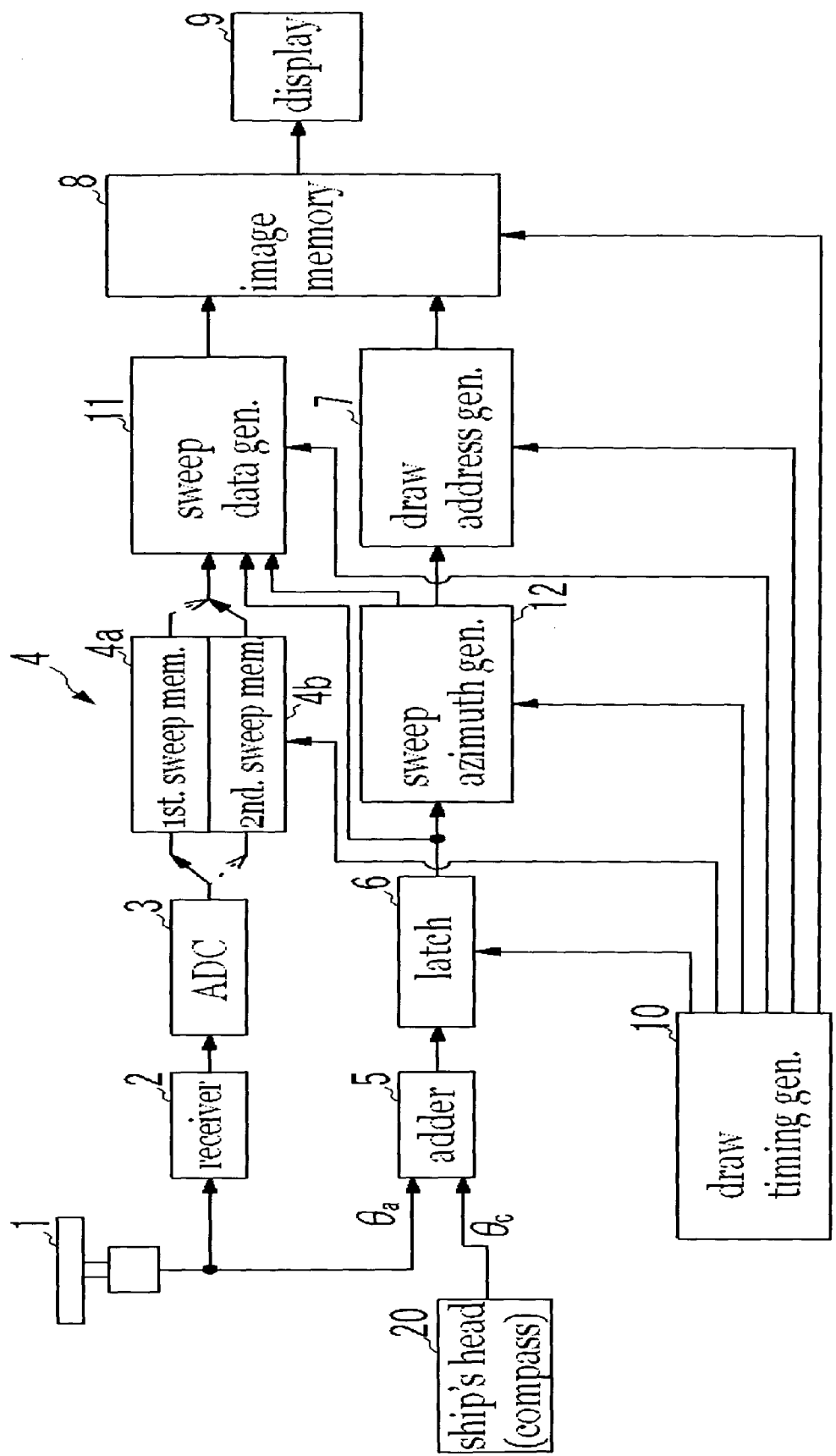
FIG. 1 is a block diagram illustrating a structure of a major portion of a radar apparatus of an embodiment of the present invention.

FIG. 1 is a block diagram illustrating a structure of a major portion of the radar apparatus of the embodiment.

An antenna 1 transmits pulses of radio waves in predetermined transmission/reception cycles to the outside, receives radio waves reflected on objects in a polar coordinate system and outputs a received signal to a receiver 2, and outputs to an adder 5 an antenna relative azimuth θa where a ship's head is a reference, while rotating on a horizontal plane in predetermined rotation cycles. The receiver 2 detects and amplifies a received signal from the antenna 1, and outputs a resultant signal to an AD converter 3. The AD converter 3 converts this analog received signal into a digital signal (received data) composed of a plurality of bits.

A sweep memory 4 is composed of a first sweep memory 4a and a second sweep memory 4b. While received data is being written (stored) into one of the sweep memories, data is being read from the other sweep memory. The first and second sweep memories 4a and 4b each store digital received data (real sweep data) corresponding to one sweep in real time, and outputs the real sweep data to an image memory 8 by the time when received data (real sweep data) obtained by the next transmission is written again.

The adder 5 adds the antenna relative azimuth θa input from the antenna 1 with a ship's head θc measured with a compass 20 to calculate a north-up display sweep azimuth θ=θa+θc and outputs it to a latch circuit 6. Note that, in the case of north-up display, the addition is performed in the adder 5, however, in the case of head-up display, the addition is not performed, and the antenna relative azimuth θa is directly input from the antenna 1 to the latch circuit 6.

The latch circuit 6 latches the input sweep azimuth θ or θa simultaneously with the start of sweep and outputs the azimuth as a real sweep azimuth to a sweep azimuth generator 12 and a sweep data generator 11. By latching the sweep azimuth using the latch circuit 6, the sweep azimuth (real sweep azimuth) is prevented from changing during the time when real sweep data is read from the first and second sweep memories 4a and 4b and is then written into the image memory 8.

A draw address generator 7 creates addresses which designate pixels in the image memory 8 arranged in a corresponding rectangular coordinate system based on a sweep azimuth θs directing outward from a center of sweep and a read position r in the first and second sweep memories 4a and 4b, where the center of sweep is a start address. The sweep azimuth θs is defined with a draw sweep azimuth determined by the sweep azimuth generator 12 described below. Specifically, the draw address generator 7 is composed of hardware which realizes the following expressions.

For example, north-up display is performed where the north direction is a reference.

$$X = Xs + r \cdot \sin\theta s$$

$$Y = Ys + r \cdot \cos\theta s$$

X, Y: addresses designating a pixel in an image memory
Xs, Ys: addresses of the center of sweep
r: distance from the center
θs: sweep azimuth A draw timing generator 10 generates a control signal required for drawing, and outputs the signal to a sweep memory 4, the latch circuit 6, the draw address generator 7, the image memory 8, the sweep data generator 11, and the sweep azimuth generator 12.

The image memory 8 has a capacity which stores sweep data corresponding to one cycle of sweeping, as image data (real sweep data+interpolated sweep data). When a display 9 is subjected to raster scanning, the image data is read from the image memory 8 by a display control section (not shown) and is output to the display, in synchronization with raster scanning performed on the display 9.

The sweep azimuth generator 12 corresponds to interpolated sweep azimuth calculator of the present invention, and generates an azimuth of an interpolated sweep which is to be formed between a current real sweep azimuth and the previous real sweep azimuth, based on the current real sweep azimuth and the previous real sweep azimuth.

Figure 2:
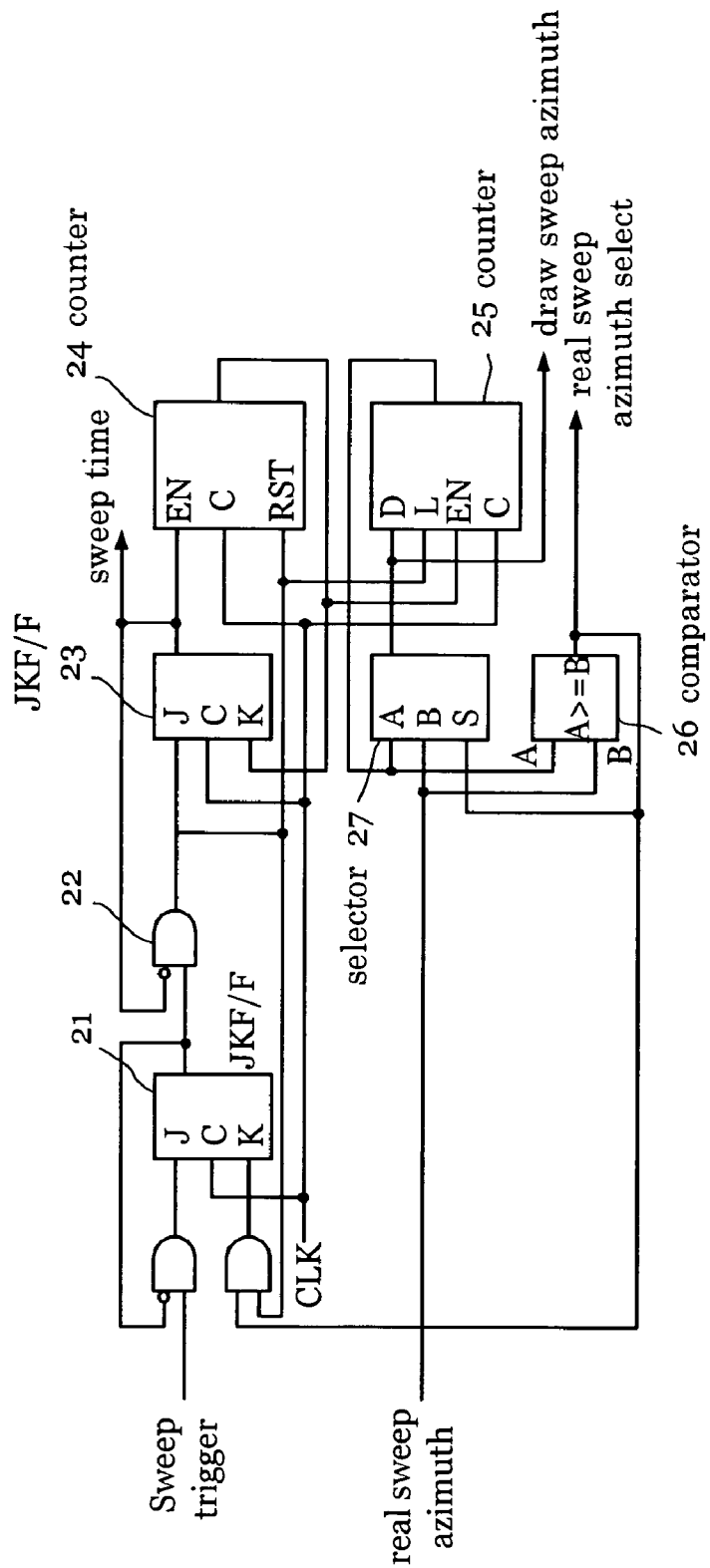
FIG. 2 is an equivalent circuit diagram of a sweep azimuth generator 12.
Figure 3:
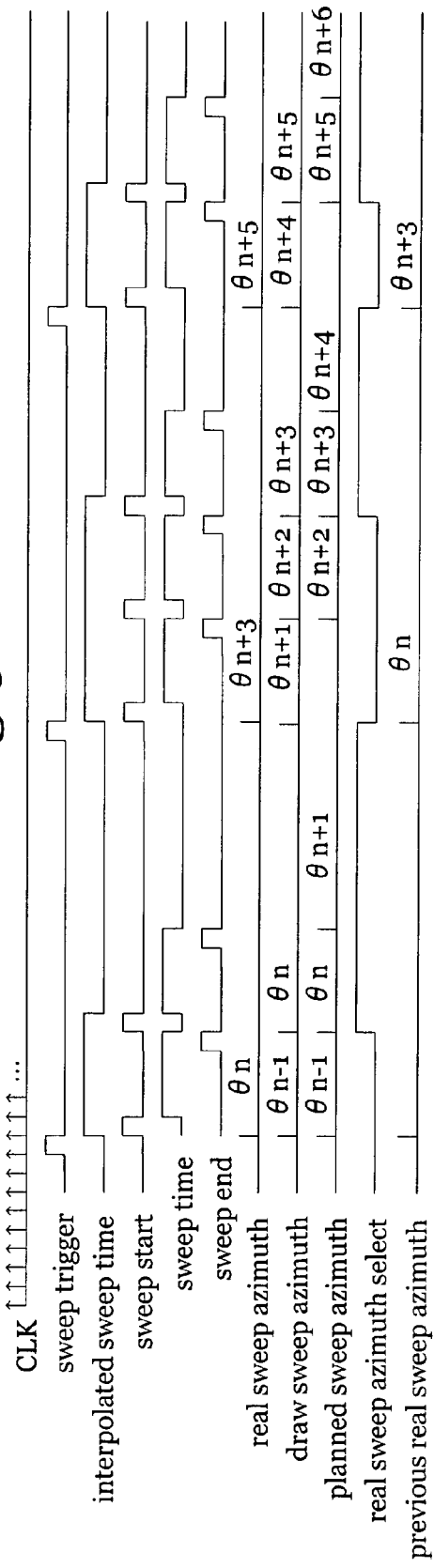
FIG. 3 is a timing chart of the sweep azimuth generator 12.

Specifically, the sweep azimuth generator 12 is composed of a circuit indicated with an equivalent circuit diagram illustrated in FIG. 2, and is operated in accordance with a timing chart illustrated in FIG. 3. FIG. 2 is an equivalent circuit diagram of the sweep azimuth generator, and FIG. 3 is a timing chart thereof.

A sweep trigger is a trigger signal for activating a sweep drawing operation of the image memory 8, and is generated at a time when writing (storage) of real sweep data is ended in one of the first and second sweep memories 4a and 4b of the sweep memory 4, which is in turn ready to be read to the sweep data generator 11. The sweep trigger is input to a first-stage AND gate of the sweep azimuth generator 12, and at the same time, to the latch circuit 6.

A JKF/F 21 generates an interpolated sweep time signal by being set with an input sweep trigger, and after setting, being reset when an interpolated sweep is ended and the next real sweep is activated (when a real sweep azimuth select signal is input from a comparator 26). The interpolated sweep time signal indicates that a sweep in this period of time is an interpolated sweep if the signal value is "1", and that a sweep in this period of time is a real sweep if the signal value is "0".

An AND gate 22 generates a sweep start signal for setting a JKF/F 23 if an interpolated sweep time signal from the JKF/F 21 is "1" and a sweep time signal from the JKF/F 23 is "0". Note that, during a period of time when the interpolated sweep time signal is "1", if one sweep operation is completed, the next sweep operation is activated, following the previous operation. Thereby, sweep operations can be continuously generated.

The JKF/F 23 generates a sweep time signal by being set with a sweep start signal from the AND gate 22 and being reset with a sweep end signal from a counter 24, and outputs the sweep time signal to the AND gate 22, the counter 24, and the sweep data generator 11. The sweep time signal, when the signal value is "1", indicates a sweep drawing operation time period.

The counter 24 is a timer which counts a drawing operation time corresponding to one sweep, and when a sweep start signal is input, is reset and starts counting. When a count value corresponding to one sweep is reached, the counter 24 generates and outputs a sweep end signal to the JKF/F 23 and a counter 25.

The counter 25 sets a sweep azimuth at a time when a sweep start signal is input, based on the sweep start signal from the AND gate 22 and the sweep azimuth from a selector 27. Thereafter, when a sweep end signal is input from the counter 24, the counter 25 starts counting, and when a predetermined count value is reached, generates the next interpolated sweep azimuth (planned interpolated sweep azimuth).

The comparator 26 compares the sweep azimuth of a real sweep input from the latch circuit 6 with a planned interpolated sweep azimuth from the counter 25, and when the planned interpolated sweep azimuth is larger than or equal to the real sweep azimuth, detects the end of interpolated sweep. After detecting the end of interpolated sweep, the comparator outputs a real sweep azimuth select signal via an AND gate to JKF/K 21, and at the same time, to the selector 27. In addition, the real sweep azimuth select signal is output to the sweep data generator 11.

Based on the real sweep azimuth select signal from the comparator 26, the selector 27 selects a real sweep azimuth input from the latch circuit 6 when the signal value is "1", and a planned interpolated sweep azimuth from the counter 25 when the signal value is "0", and outputs the selected azimuth as a draw sweep azimuth to the draw address generator 7.

Here, the above-described interpolated sweep azimuth is calculated using the following method.

When a real sweep azimuth $\alpha$ at a certain time (current real sweep azimuth) is input, an interpolated sweep azimuth between the real sweep azimuth $\alpha$ and the previous real sweep azimuth $\beta$ is calculated based on the real sweep azimuth $\alpha$ and the previous real sweep azimuth $\beta$.

Specifically, an angle difference $\delta$ between sweeps required to update the image memory is set in advance based on the number of pixels, a sweep radius, and the like.

Interpolated sweep azimuths $\beta+\delta$, $\beta+2\delta$, ..., and $\beta+NN\delta$ are successively obtained from the previous real sweep azimuth $\beta$. These interpolated sweep azimuths are calculated by successively adding $\delta$ in a loop of the selector 27 and the counter 25 as described above. When the interpolated sweep azimuth reaches $\beta+N\delta$ which is larger than or equal to the current real sweep azimuth $\alpha$, calculation of an interpolated sweep azimuth is suspended until the next real sweep azimuth is input. By repeatedly performing this operation, draw sweep azimuths can be obtained for all azimuths.

In this case, an interval between the current real sweep and the previous real sweep is divided by interpolated sweeps into a division number N:

$$N=|\alpha-\beta|/\delta.$$

Therefore, the number of interpolated sweeps between the previous real sweep and the current real sweep is:

$$NN=N-1.$$

According to this feature, the number of interpolated sweeps and the azimuths between adjacent real sweeps are calculated as appropriate based on both the azimuths and the azimuth difference of the adjacent real sweeps.

The sweep data generator 11 corresponds to a final stage of sweep data formation of the present invention, and receives real sweep data from the first and second sweep memories 4a and 4b of the sweep memory 4 and a real sweep azimuth select signal and a sweep time signal from the sweep azimuth generator 12, and generates and outputs real sweep data and interpolated sweep data interpolated between adjacent pieces of real sweep data to the image memory 8.

Figure 4:
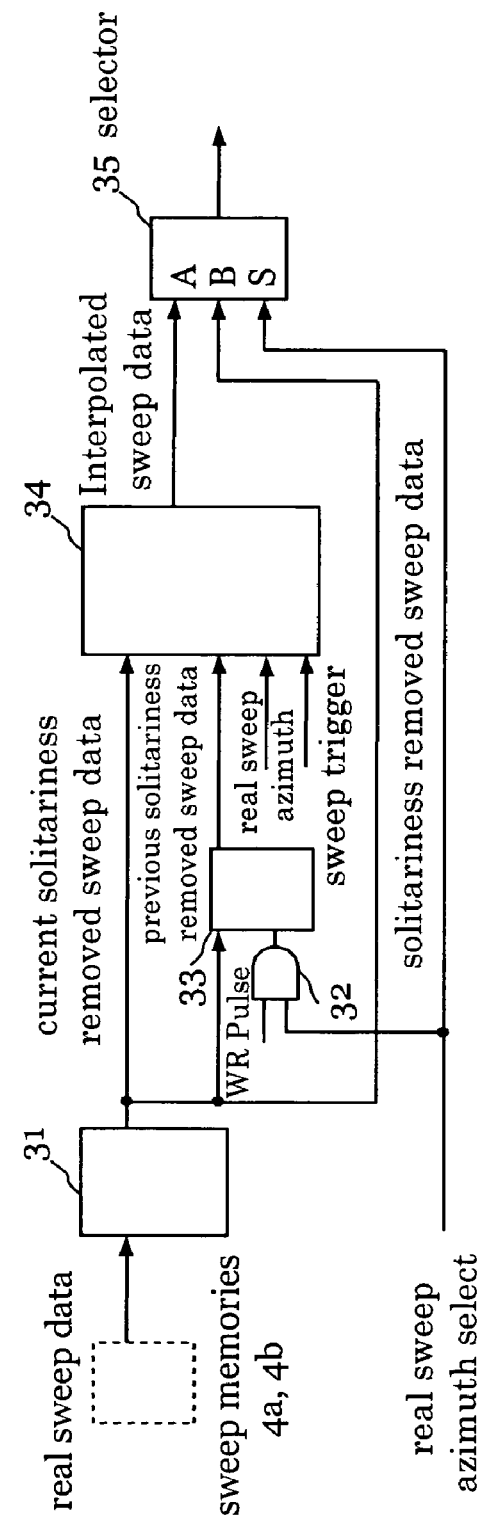
FIG. 4 is an equivalent circuit diagram of a sweep data generator.

Specifically, the sweep data generator 11 is composed of a circuit indicated with an equivalent circuit diagram illustrated in FIG. 4. FIG. 4 is an equivalent circuit diagram of the sweep data generator.

Figure 5:
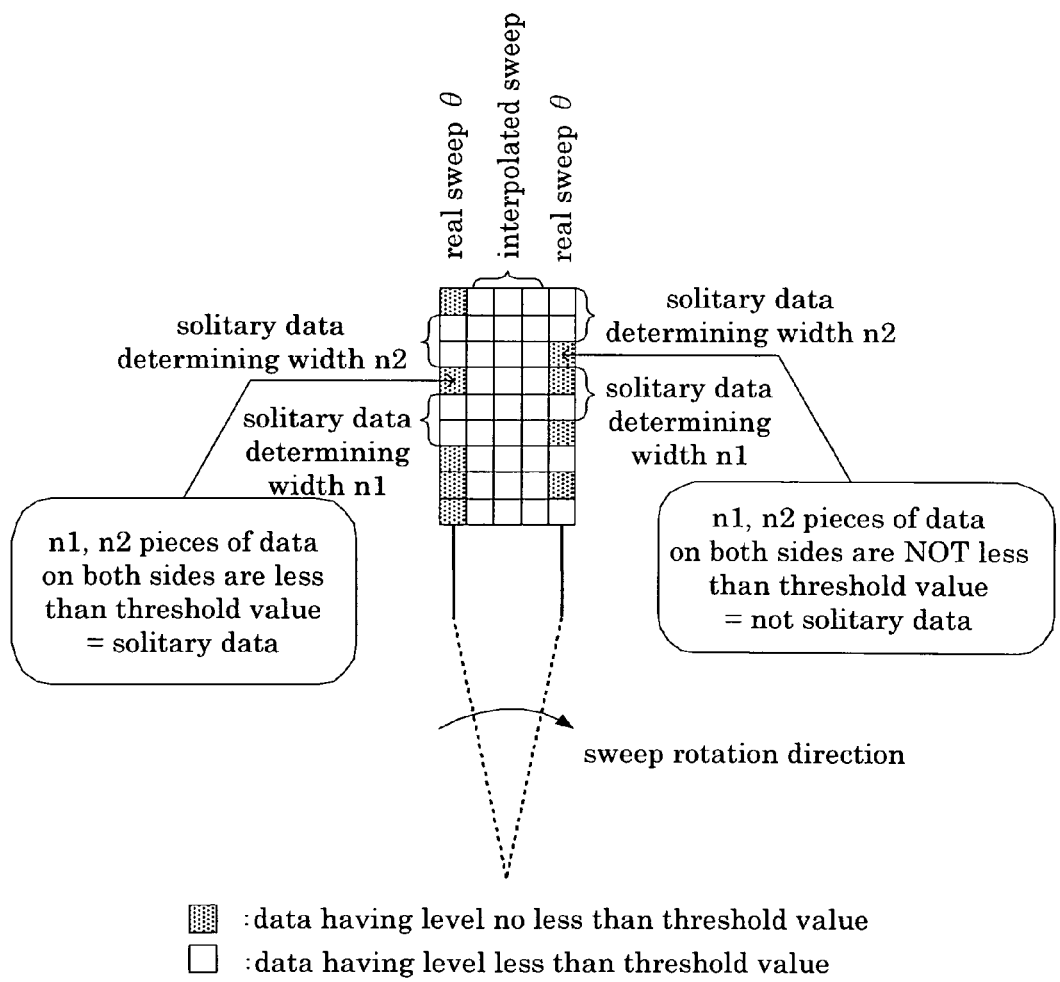
FIG. 5 is a diagram for explaining a reference for solitary data.

A solitariness remover 31 corresponds to corrected sweep former of the present invention, and detects and removes solitary data in the distance direction of real sweep data input from the sweep memory 4 to generate solitariness removed real sweep data. This operation is performed every time real sweep data is read out after being stored into the sweep memory 4. Specifically, after real sweep data is stored into the first sweep memory 4a, the real sweep data stored in the first sweep memory 4a is read and is subjected to a solitariness removing process, and thereafter, after sweep data is stored into the second sweep memory 4b, the sweep data stored in the second sweep memory 4b is read and is subjected to the solitariness removing process. Note that solitary data is defined as data which has a value larger than or equal to a predetermined threshold value and has only neighboring data of less than the threshold value in a predetermined range (n1, n2) extending in the front and rear in the distance direction thereof, as illustrated in FIG. 5.

Figure 6:
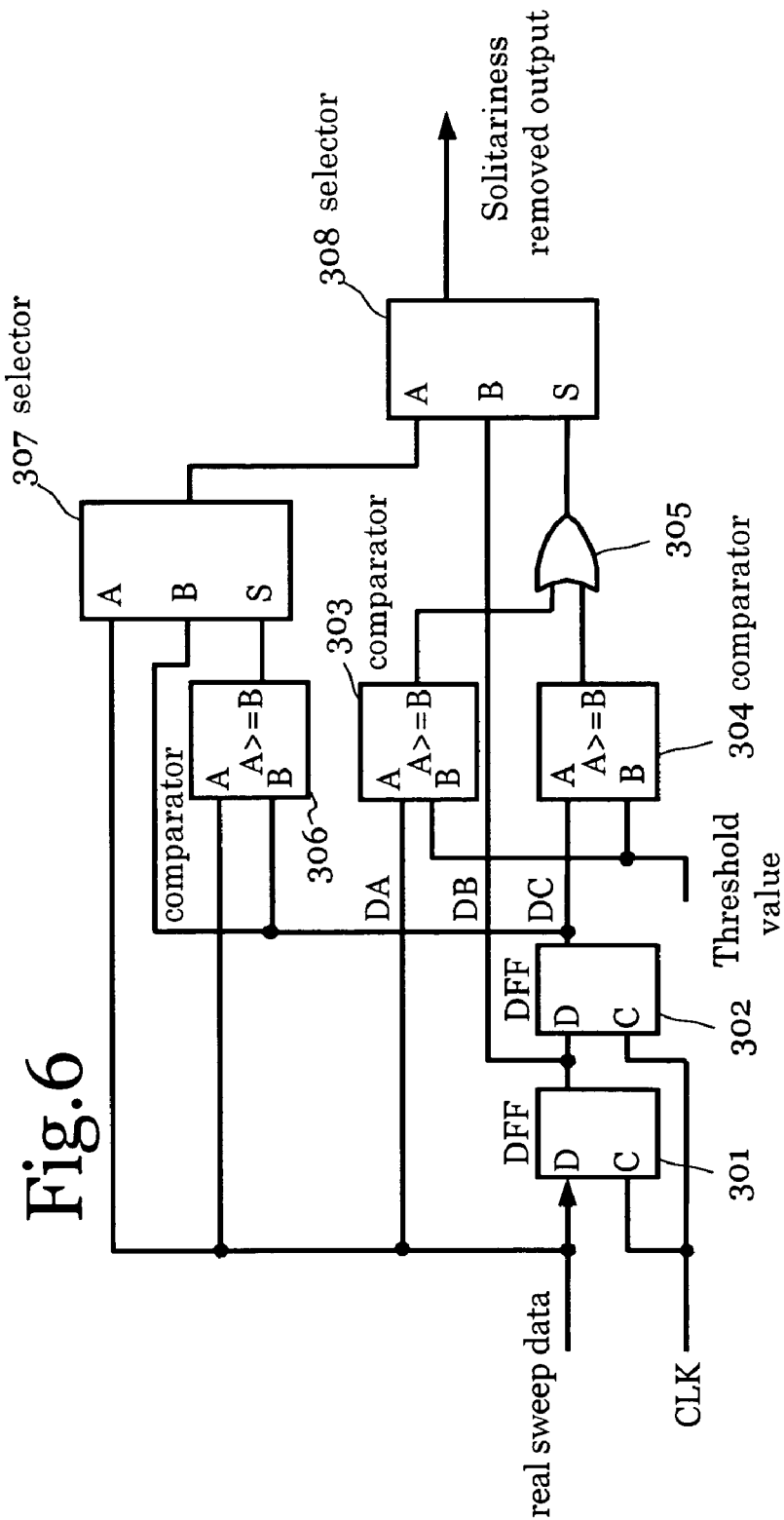
FIG. 6 is an equivalent circuit diagram of a solitariness remover 31.

Here, specifically, the solitariness remover 31 is composed of a circuit indicated with an equivalent circuit diagram illustrated in FIG. 6.

FIG. 6 is an equivalent circuit diagram of the solitariness remover 31.

Figure 7:
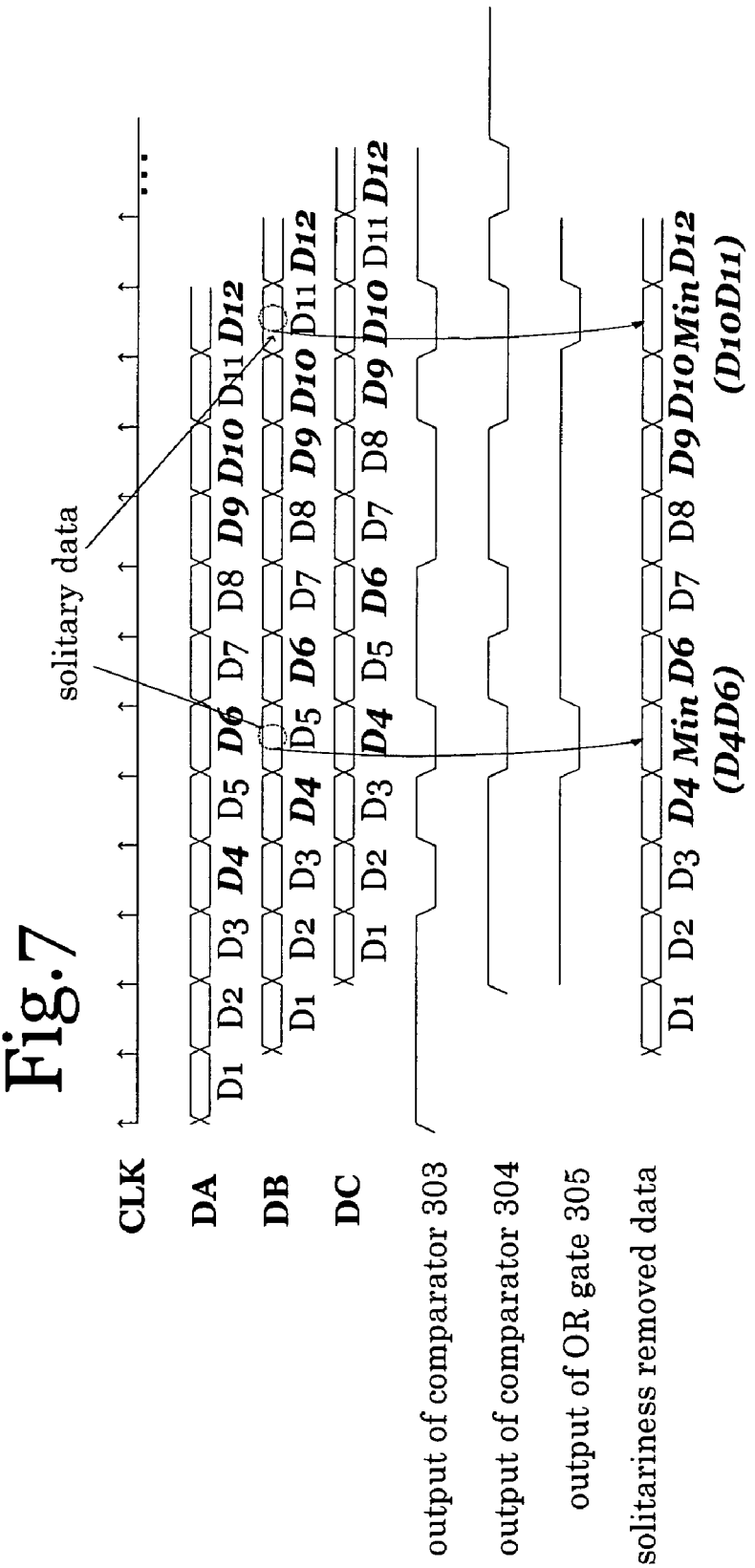
FIG. 7 is a timing chart of a solitariness removing operation.

FIG. 7 is a timing chart of the solitariness removing operation. In FIG. 7, D1 to D12 indicate pieces of data which are present on the same sweep and whose distances from the center increases successively from D1. min(Da, Db) indicates one of the sweep data Da and Db which is the smaller. Note that, in the following description, the solitariness remover 31 is a circuit where a piece of data adjacent to each of the front and rear of data of interest is a reference for solitariness in the distance direction.

DFFs 301 and 302 shift data read from the sweep memory 4 by one clock in the distance direction. Here, data which is read out but is not subjected to a delay operation is represented by DA, data which is delayed by one clock is represented by DB, and data which is further delayed by one clock is represented by DC. The DFF 301 outputs the data DB to a selector 306, and the DFF 302 outputs the data DC to a comparator 304, a comparator 306, and a selector 307.

A comparator 303 compares the data DA with a preset threshold value, and if DA is larger than or equal to the threshold value, outputs a detection signal "1" to an OR gate 305.

The comparator 304 compares the data DC with the threshold value, and if DC is larger than or equal to the threshold value, outputs a detection signal "1" to the OR gate 305.

Based on the two input detection signals, if one of them is "1", the OR gate 305 outputs a select signal "1" to a selector 308.

The comparator 306 compares the data DA with the data DC, and if the data DA is larger than the data DC, outputs a detection signal "1" to the selector 307.

The selector 307 receives the data DA and DC, and if a detection signal "1" is input from the comparator 306, outputs the data DC to the selector 308, and if a detection signal "0" is input, outputs the data DA to the selector 308.

The selector 308 receives the data DA or DC which is the smaller from the selector 307, and the data DB, and if a select signal "1" is input from the OR gate 305, outputs the data DB, and if not, outputs the data DA or DC selected by the selector 307.

According to this feature, it is confirmed whether or not the data DA and DC in the front and rear of the data DB of interest are larger than or equal to the predetermined threshold value, and if one of them is larger than or equal to the threshold value, the data DB is not solitary in the distance direction, and therefore, is output directly. On the other hand, if both of the data are less than the threshold value, the data DB is solitary in the distance direction, and therefore, the data DA or DC which is the smaller is output rather than the data DB. In this manner, real sweep data from which solitariness in the distance direction is removed (solitariness removed real sweep data) is output to a linearly interpolated data generator 34, a real sweep azimuth memory 33, and a selector 35.

Here, for example, as illustrated in FIG. 8, a solitariness removing process when real sweep data is read will be described.

FIGS. 8(a)-(c) show data configuration diagrams illustrating details of the solitariness removing process, FIG. 8(a) is a data configuration diagram before the solitariness removing process, FIG. 8(b) is a data configuration diagram after the solitariness removing process, and FIG. 8(c) is a data configuration diagram illustrating a state of interpolated sweep data which is generated based on these pieces of data using a linear interpolation process described below and is stored in the image memory 8. Note that, in this figure, the threshold value is assumed to be "1".

In sweep data of FIG. 8(a), data Dα1 of a real sweep θm and data Dα2 of a real sweep θn are solitary data. Therefore, the data Dα1 and Dα2 are subjected to the solitariness removing process so that, as illustrated in FIG. 8(b), one of adjacent pieces of sweep data in the distance direction which is the smaller is replaced with data "0". Based on this data configuration, interpolated sweep data between adjacent pieces of real sweep data is generated using a linear interpolation process described below. Thereby, data actually stored in the image memory 8 has the configuration of FIG. 8(c). According to this feature, an influence of noise-like data solitary in the distance direction on sweep data (real sweep data and interpolated sweep data) can be suppressed, so that a detection image in which noise is not unnecessarily emphasized can be obtained.

A sweep memory 33 stores solitariness removed real sweep data from the solitariness remover 31, based on a real sweep azimuth select signal input via an AND gate 32, when a real sweep azimuth is selected.

The linearly interpolated data generator 34 corresponds to corrected interpolated sweep data calculator of the present invention, and receives solitariness removed real sweep data (current solitariness removed real sweep data) generated from current sweep data in the solitariness remover 31, and solitariness removed real sweep data (the previous solitariness removed real sweep data) generated from the previous real sweep data stored in the sweep memory 33, and subjects them to the linear interpolation process.

In this manner, the linear interpolation process is performed to generate interpolated sweep data, which is in turn output to the selector 35. Here, specifically, the linearly interpolated data generator 34 is composed of a circuit indicated with an equivalent circuit diagram illustrated in FIG. 9.

Figure 9:
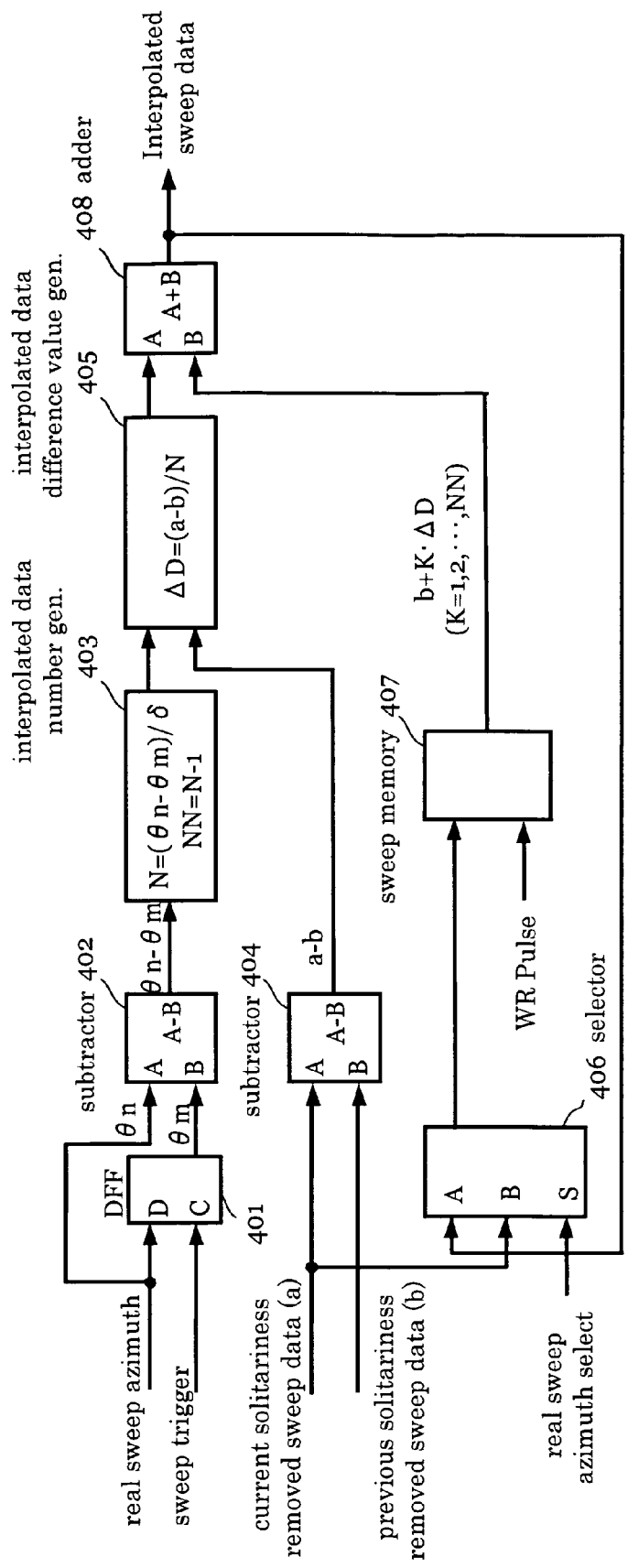
FIG. 9 is an equivalent circuit diagram of a linearly interpolated data generator 34.

FIG. 9 is an equivalent circuit diagram of the linearly interpolated data generator 34.

A DFF 401 delays a real sweep azimuth input from the latch circuit 6 based on an input cycle of a sweep trigger and outputs the result to a subtractor 402.

The subtractor 402 receives the current real sweep azimuth θn input from the latch circuit 6 and the previous real sweep azimuth θm delayed by the DFF 401, performs a subtraction process (θn−θm), and outputs the result to an interpolated data number generator 403.

The interpolated data number generator 403 calculates the division number N between real sweeps to be divided by interpolated sweeps, and the number of interpolated sweeps NN by the following expressions, based on a preset sweep azimuth difference δ which is an angle difference between sweeps required to update the image memory 8, and the real sweep azimuth difference (θn−θm) input from the subtractor 402.

$N=(\theta n-\theta m)/\delta$ $NN=N-1$

The results N and NN are output to an interpolated data difference value generator 405.

A subtractor 404 receives solitariness removed real sweep data (a) of the current real sweep (θn) and solitariness removed real sweep data (b) of the previous real sweep (θm), and performs a subtraction process (a−b), and outputs the result to the interpolated data difference value generator 405.

The interpolated data difference value generator 405 calculates a difference value AD between pieces of interpolated sweep data by the following expression, based on the division number N input from the interpolated data number generator 403 and the data difference value (a−b) input from the subtractor 404.

$\Delta D=(a-b)/N$

The result ΔD is output to an adder 408.

A selector 406 receives the previous solitariness removed real sweep data (b) and interpolated sweep data output from the adder 408, and if a real sweep azimuth select signal has been input, outputs the previous solitariness removed real sweep data (b) to a sweep memory 407, and if a real sweep azimuth select signal has not been input, outputs the interpolated sweep data from the adder 408 to the sweep memory 407.

The sweep memory 407 has a memory capacity corresponding to one sweep, and stores the previous solitariness removed real sweep data (b) or the interpolated sweep data, and outputs the stored data to the adder 408 when the next interpolated sweep data is generated in the adder 408.

According to this feature, interpolated sweep data b+ΔD, b+2ΔD, and b+NNΔD are generated between the previous real sweep and the current real sweep.

Based on a real sweep azimuth select signal, the selector 35 outputs solitariness removed real sweep data input from the solitariness remover 31 if the signal value is "1", and outputs interpolated sweep data input from the linearly interpolated data generator 34 if the signal value is "0".

Next, an operation of the whole radar apparatus will be described with reference to FIG. 10.

Figure 10:
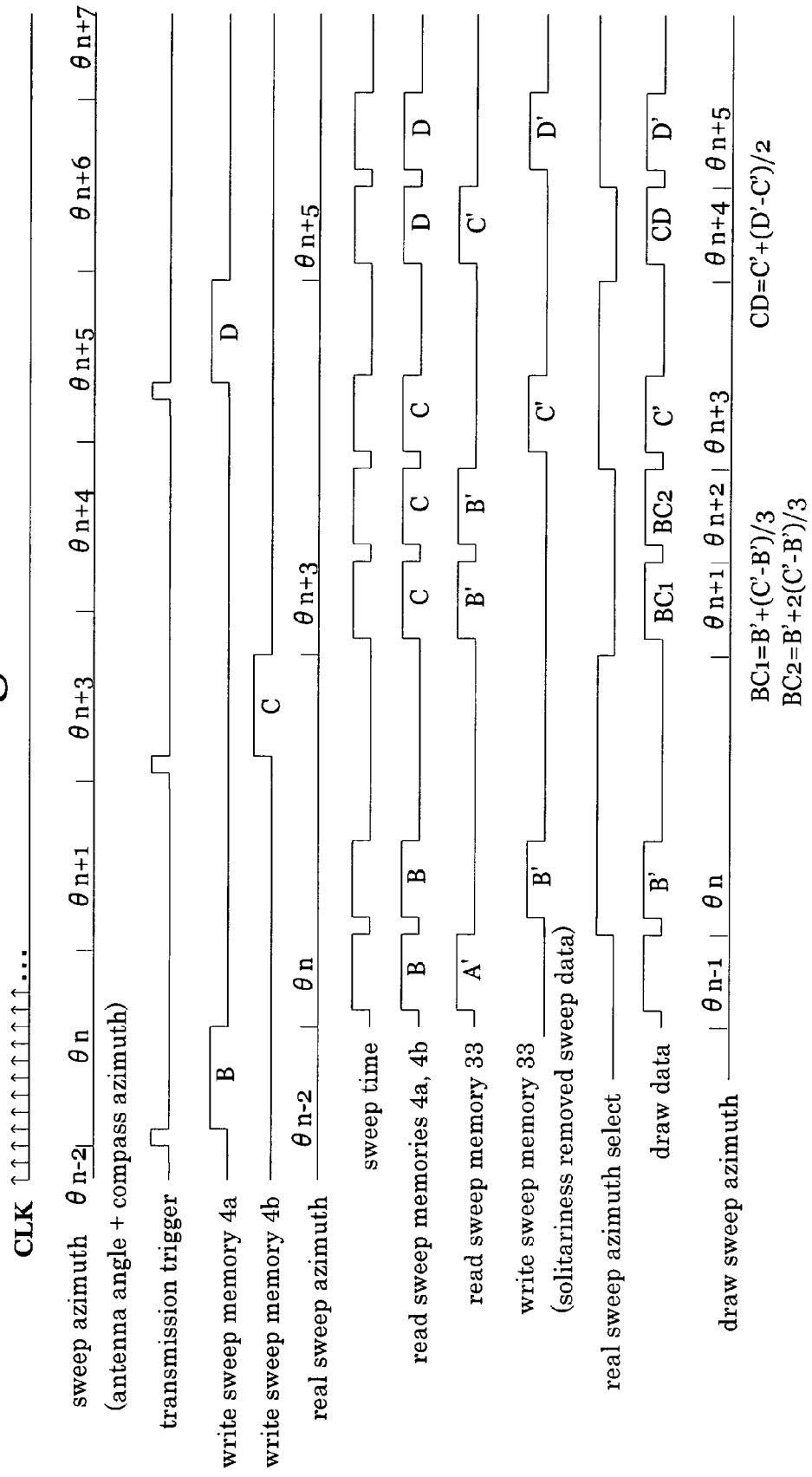
FIG. 10 is a timing chart of the radar apparatus of the embodiment.

FIG. 10 is a timing chart of the radar apparatus of the embodiment.

A transmission trigger is a trigger signal which provides timing of transmission of radio waves. Real sweep data is written into the first sweep memory 4a and the second sweep memory 4b alternately in accordance with the transmission trigger. Specifically, as illustrated in FIG. 10, initially, real sweep data B is written into the first sweep memory 4a, and with the next transmission trigger, real sweep data C is written into the second sweep memory 4b, and with the following transmission trigger, real sweep data D is written into the first sweep memory 4a. A sweep azimuth θ at this time is output to the adder 5, is latched in the latch circuit 6, and is input to the sweep azimuth generator 12.

A sweep time signal is generated with the above-described sweep trigger in the sweep azimuth generator 12. Based on the sweep time signal, the sweep data generator 11 reads real sweep data stored in the first sweep memory 4a or the second sweep memory 4b. Specifically, at a sweep time which is generated by a first sweep trigger since the real sweep data B has been completely written into the first sweep memory 4a, the sweep data generator 11 reads the real sweep data B from the first sweep memory 4a, and performs the above-described solitariness removing process. Next, after the real sweep data C has been completely written into the second sweep memory 4b, the sweep data generator 11 reads the real sweep data C and performs the above-described solitariness removing process.

The sweep azimuth generator 12 calculates sweep azimuths, θn+1 and θn+2, of interpolated sweeps based on a sweep azimuth θn+3 of a current real sweep and a sweep azimuth θn of the previous real sweep, using the above-described method.

Specifically, it is assumed that the azimuths of adjacent real sweeps are θn and θm, a maximized angle difference between sweeps required to update the image memory 8 is δ, and the absolute value |θn−θm| of the difference between θn and θm corresponds to n interpolated sweeps:

$$(n-\delta) < |\theta n - \theta m| \leq (n+1)-\delta).$$

In this case, after the real sweep azimuth θm is input to the draw address generator 7, θm+nδ is input thereto as interpolated sweep azimuths in order of θm+δ and θm+2δ, and thereafter, the real sweep azimuth θn is input thereto. In the example of FIG. 10, after the real sweep azimuth θn is input, the interpolated sweep azimuths θn+1 and θn+2 are input, and thereafter, the real sweep azimuth θn+3 is input. Thereafter, the sweep azimuth generating operation is suspended until the next real sweep azimuth θn+5 is input. When the real sweep azimuth θn+5 is input, similarly, an interpolated sweep azimuth θn+4 and a real sweep azimuth θn+5 are input as draw sweep azimuths in this order.

The sweep azimuth generator 12 inputs a real sweep azimuth select signal and the draw sweep azimuth concurrently to the sweep data generator 11.

When the real sweep select signal is in the state of "0", the sweep data generator 11 uses the solitariness removed data of the previous real sweep data read from the sweep memory 4 and the solitariness removed data of the current real sweep data to perform the linear interpolation process, and outputs the result as interpolated sweep data to the image memory 8. On the other hand, when the real sweep azimuth select signal is in the state of "1", the sweep data generator 11 outputs the solitariness removed real sweep data to the image memory 8.

In the example of FIG. 10, at a sweep time immediately after writing of the second sweep memory 4b is ended, the real sweep select signal is "0", and therefore, the sweep data generator 11 reads the real sweep data C from the second sweep memory 4b, and performs the solitariness removing process to generate solitariness removed real sweep data C'. Thereafter, the sweep data generator 11 reads real sweep data B' which is obtained by the previous solitariness removing process, from the sweep memory 33, and performs the linear interpolation process using the solitariness removed real sweep data B' and C' to generate and output interpolated sweep data BC1 (=B'+(C'−B')/3) and BC2 (=B'+2(C'−B')/3) to the image memory 8. At this time, the interpolated sweep azimuths θn+1 and θn+2 have been successively input from the draw address generator 7 into the image memory 8, and therefore, writing of the image memory 8 is performed based on the interpolated sweep azimuths θn+1 and θn+2 and the interpolated sweep data BC1 and BC2.

Next, at a sweep time after the real sweep select signal goes to "1", the sweep data generator 11 outputs the solitariness removed real sweep data C' to the image memory 8. At this time, since the real sweep azimuth θn+3 has been input from the draw address generator 7 into the image memory 8, writing of the image memory 8 is performed based on the real sweep azimuth θn+3 and the solitariness removed real sweep data C', and at the same time, storage is performed with respect to the sweep memory 33. Next, the real sweep data D is input, and at a time when solitariness removed sweep data D' is generated, is used to generate interpolated sweep data.

Next, if a sweep time signal is generated at a time when the real sweep data D is stored into the first sweep memory 4a and is ready to be read, the sweep data generator 11 reads the real sweep data D from the first sweep memory 4a, and at the same time, the solitariness removed real sweep data C' from the sweep memory 33. Thereafter, the sweep data generator 11 subjects the real sweep data D to the solitariness removing process to generate the solitariness removed real sweep data D', and performs the linear interpolation process based on the solitariness removed real sweep data C' and D' to generate and output interpolated sweep data CD (=C'+(D'−C')/2) to the image memory 8.

On the other hand, when receiving the real sweep azimuth θn+5, the sweep azimuth generator 12 uses the above-described method to generate and output the interpolated sweep azimuth θn+4 to the draw address generator 7. The draw address generator 7 designates an address of a pixel to which the interpolated sweep data CD is to be stored, with respect to the image memory 8 based on the input interpolated sweep azimuth θn+4. The image memory 8 stores the interpolated sweep data CD in accordance with the address. Next, when the real sweep azimuth select signal goes to "1", the sweep data generator 11 outputs the solitariness removed real sweep data D' into the image memory 8. At this time, the draw address generator 7 designates an address based on the real sweep azimuth θn+5 with respect to the image memory 8, and in accordance with the address, the solitariness removed real sweep data D' is drawn. Note that the sweep data generator 11 outputs the solitariness removed real sweep data D' into the image memory 8, and at the same time, stores it into the sweep memory 33.

With such an operation, as shown in Table 2, solitariness removed real sweep data and interpolated sweep data are stored in the image memory 8.

TABLE 2

| sweep type | sweep azimuth (degree) | sweep data |
|---|---|---|
| real sweep | θn | B' |
| interpolated sweep | θn + 1 | B' + (C' − B')/3 |
| interpolated sweep | θn + 2 | B' + 2(C' − B')/3 |
| real sweep | θn + 3 | C' |
| interpolated sweep | θn + 4 | C' + (D' − C')/2 |
| real sweep | θn + 5 | D' |

(B', C', and D' are solitariness removing process data of B, C, and D)

By repeatedly performing such an operation, interpolated sweeps can be certainly formed over one cycle of sweeping.

According to this feature, an interpolated sweep(s) between real sweeps is certainly generated, and all sweeps are updated for all azimuths, thereby making it possible to prevent coexistence of current sweep data and previous sweep data.

Further, by generating interpolated sweep data by linear interpolation of adjacent pieces of real sweep data, a displayed state (intensity, etc.) does not change suddenly in a detection image of an object or the like, and changes in a stepwise manner, thereby making it possible to provide a detection image viewable to the operator.

Furthermore, solitary sweep data, such as noise or the like, is not reflected on interpolated sweep data, thereby making it possible to prevent noise from being unnecessarily emphasized in a detection image.

Figure 11:
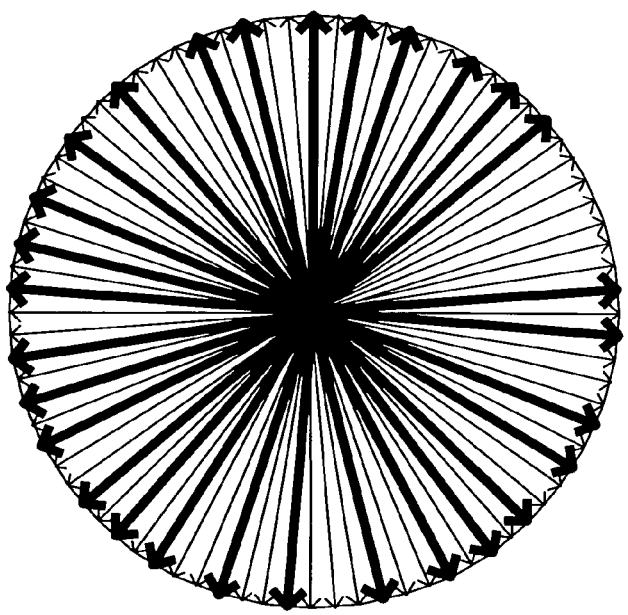
FIG. 11 is a configuration diagram of real sweeps and interpolated sweeps in one cycle of sweeping by the radar apparatus of the embodiment.
Figure 12:
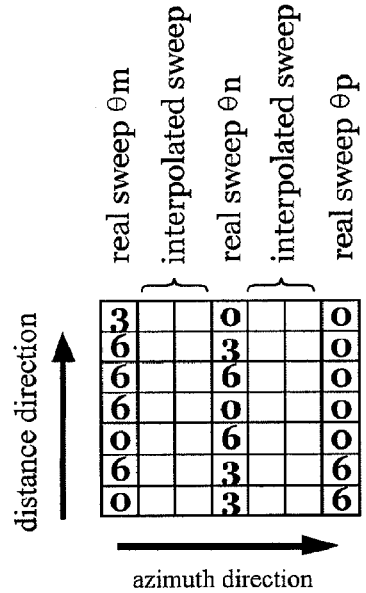
FIG. 12(a) is a detection image configuration diagram.
FIG. 12(b) is a detection image configuration diagram.
FIG. 12(c) is a detection image configuration diagram.
FIG. 12(d) is a detection image configuration diagram.
FIG. 12(e) is a detection image configuration diagram.
FIG. 12(f) is a detection image configuration diagram.
Figure 12:
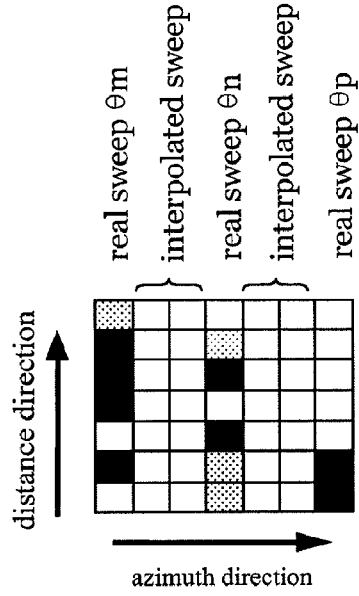
Figure 12:
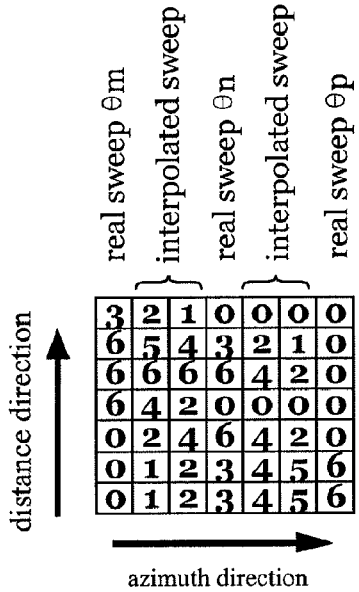
Figure 12:
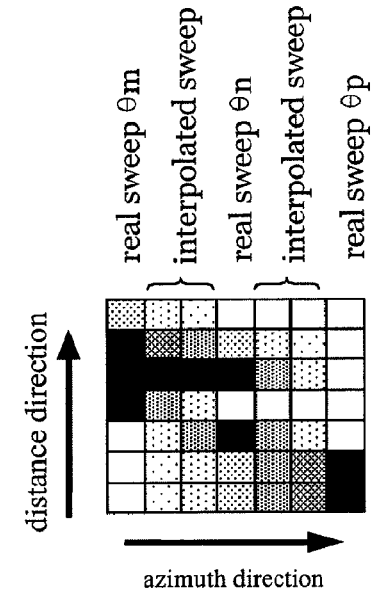
Figure 12:
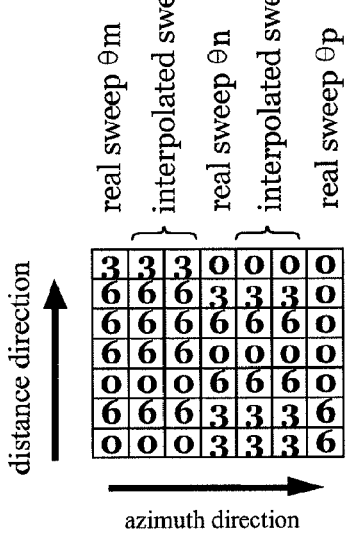
Figure 12:
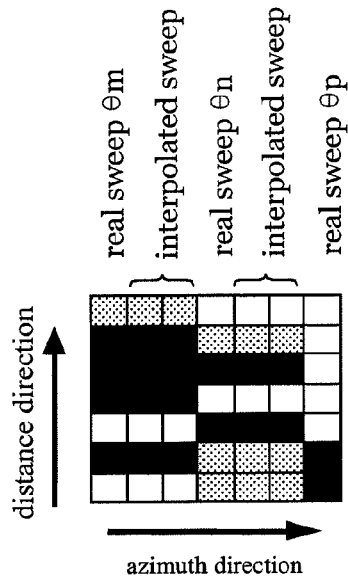
Figure 13:
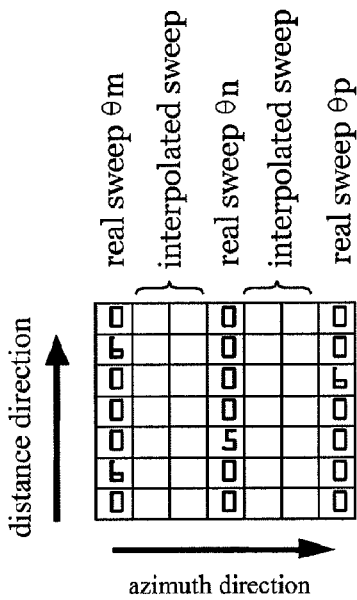
FIG. 13(a) is a detection image configuration diagram.
FIG. 13(b) is a detection image configuration diagram.
FIG. 13(c) is a detection image configuration diagram.
FIG. 13(d) is a detection image configuration diagram.
FIG. 13(e) is a detection image configuration diagram.
FIG. 13(f) is a detection image configuration diagram.
Figure 13:
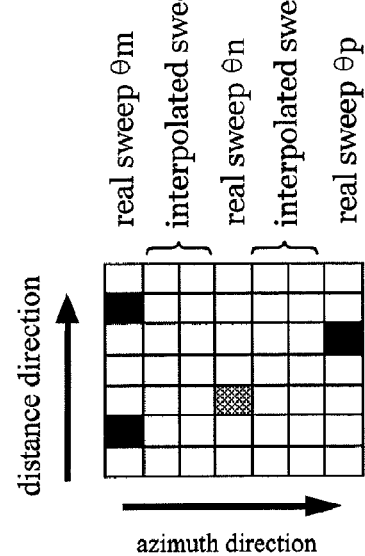
Figure 13:
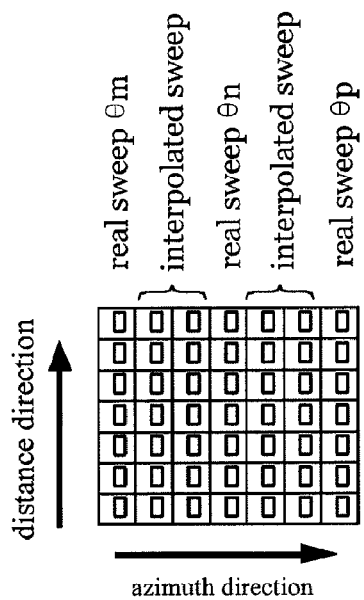
Figure 13:
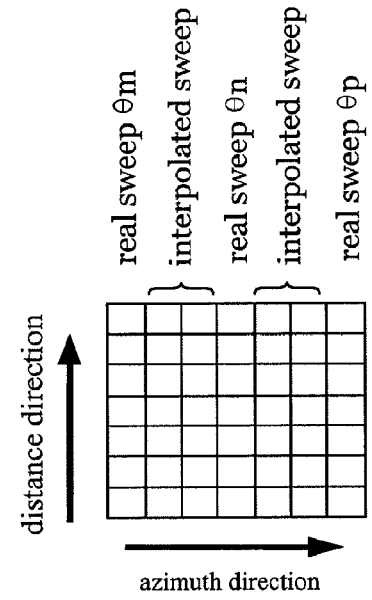
Figure 13:
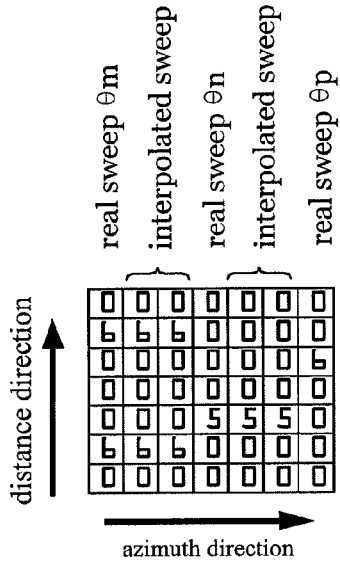
Figure 13:
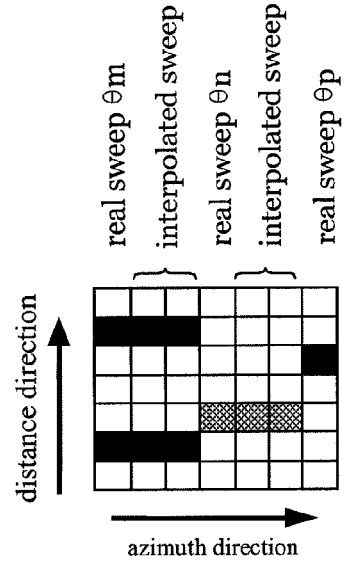
Figure 14:
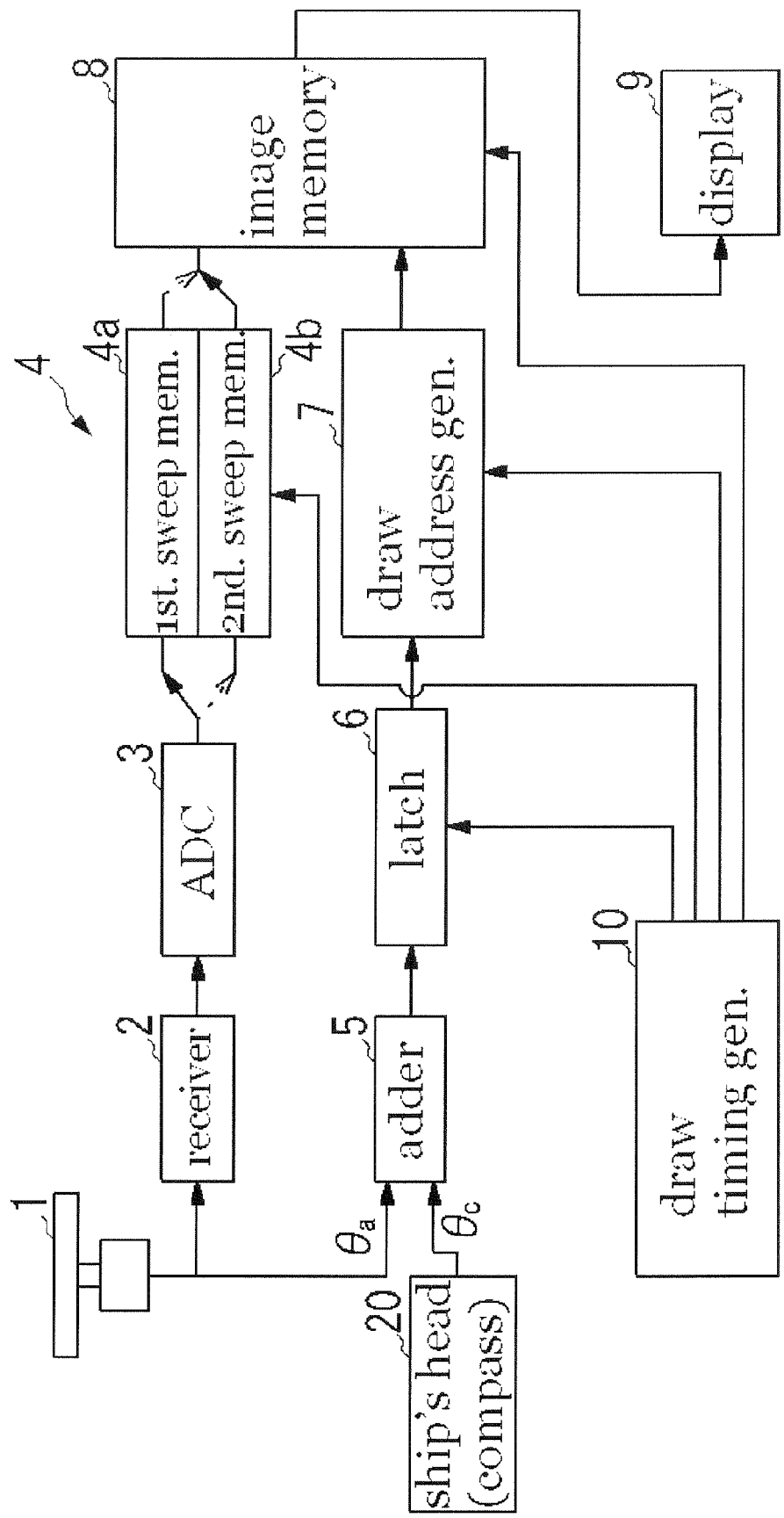
FIG. 14 is a block diagram illustrating a structure of a major portion of a conventional radar apparatus.
Figure 15:
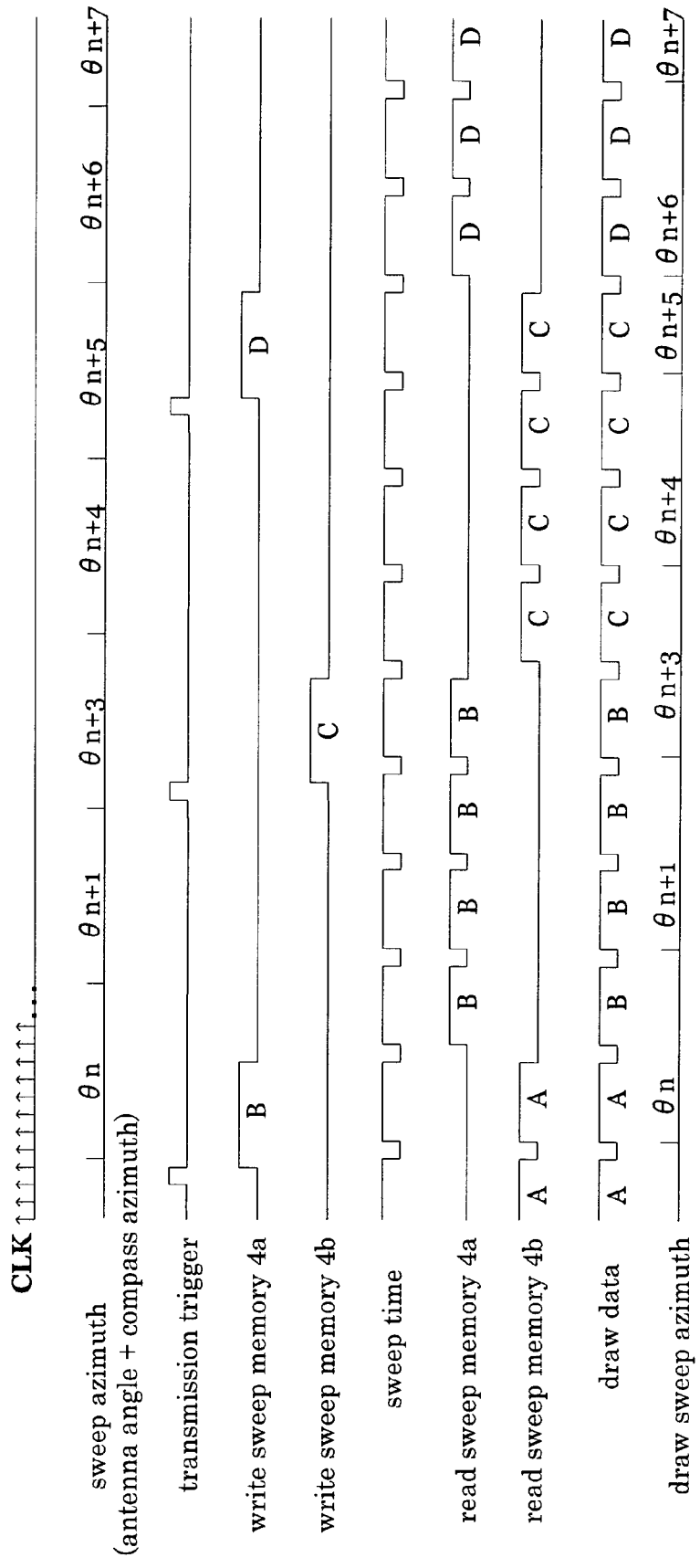
FIG. 15 is a timing chart of the conventional radar apparatus.
Figure 16:
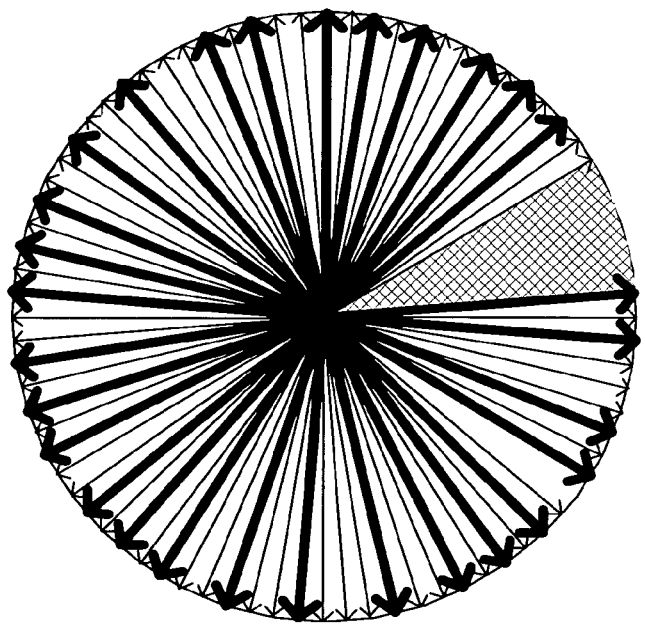
FIG. 16 is a sweep configuration diagram of image data by the conventional radar apparatus.
Figure 17:
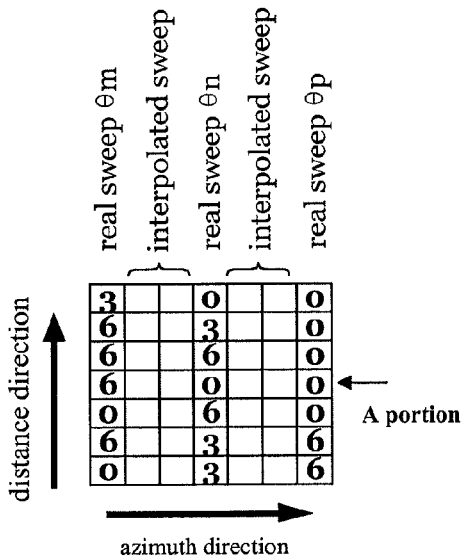
FIG. 17(a) is a detection image configuration diagram by the conventional radar apparatus.
FIG. 17(b) is a detection image configuration diagram by the conventional radar apparatus.
FIG. 17(c) is a detection image configuration diagram by the conventional radar apparatus.
FIG. 17(d) is a detection image configuration diagram by the conventional radar apparatus.
Figure 17:
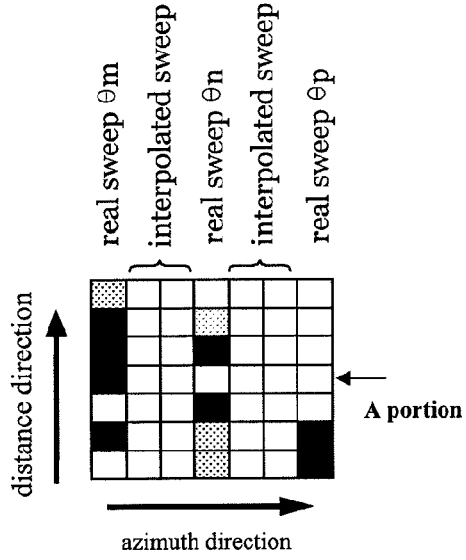
Figure 17:
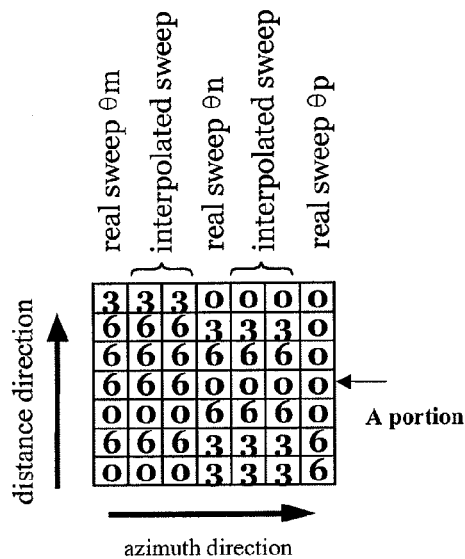
Figure 17:
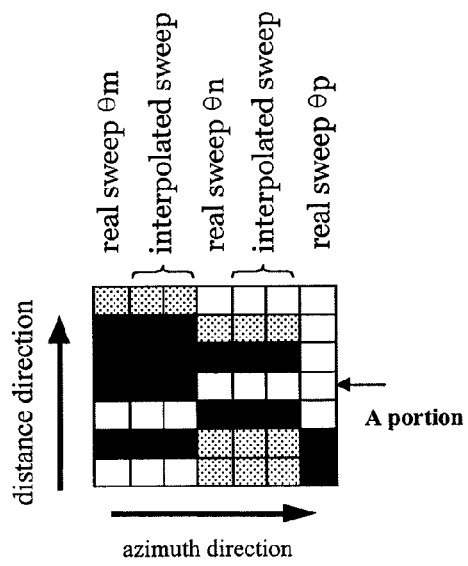
Figure 18:
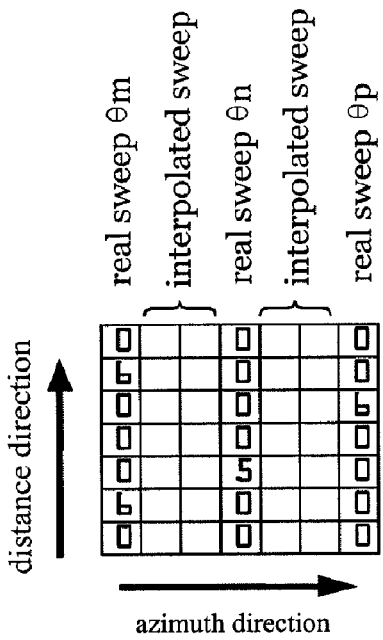
FIG. 18(a) is a detection image configuration diagram by the conventional radar apparatus.
FIG. 18(b) is a detection image configuration diagram by the conventional radar apparatus.
FIG. 18(c) is a detection image configuration diagram by the conventional radar apparatus.
FIG. 18(d) is a detection image configuration diagram by the conventional radar apparatus.
Figure 18:
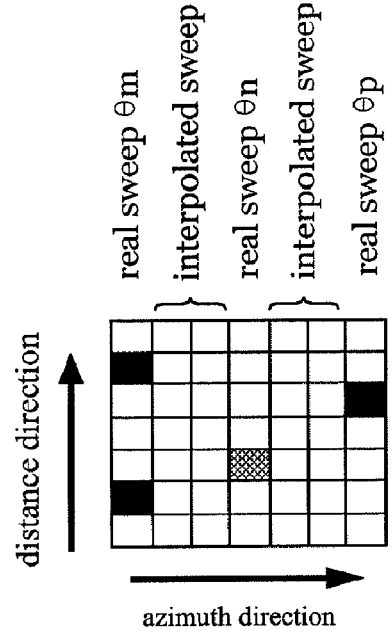
Figure 18:
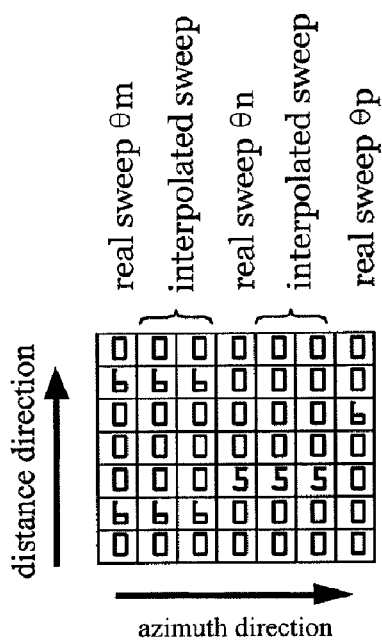
Figure 18:
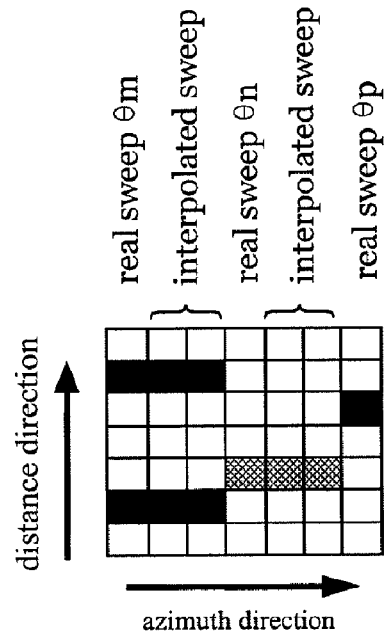

These effects are illustrated in FIGS. 11 to 13.

FIG. 11 is a configuration diagram of real sweeps and interpolated sweeps in one cycle of sweeping. As illustrated in FIG. 11, real sweeps and interpolated sweeps can be formed over one cycle of sweeping without being affected by intervals between real sweeps, thereby avoiding coexistence of an image of a current cycle of sweeping and an image of the previous cycle of sweeping.

FIGS. 12(a) to (f) are configuration diagrams of detection images. Here, FIG. 12(a) is an image configuration diagram in which actual received data is represented by numerical values, and FIG. 12(b) is a configuration diagram of an image in which intensity is changed, depending on the numerical values of FIG. 12(a). FIG. 12(c) is an image configuration diagram in which image data when the process of the present invention is used is represented by numerical values, and FIG. 12(d) is a configuration diagram of an image in which intensity is changed, depending on the numerical values of FIG. 12(c). FIG. 12(e) is an image configuration diagram in which image data when the conventional process is used is represented by numerical values, and FIG. 12(f) is a configuration diagram of an image in which intensity is changed, depending on the numerical values of FIG. 12(e). Note that, in FIG. 12(b), FIG. 12(d), and FIG. 12(f), a higher density of a pixel indicates a higher intensity of the pixel. As indicated with these diagrams, whereas the detection image of the conventional radar apparatus changes suddenly, the detection image of the radar apparatus of the present invention changes in a stepwise manner, so that the detection image is viewable for the operator.

FIGS. 13(a) to (f) are also configuration diagrams of detection images. Here, FIG. 13(a) is an image configuration diagram in which actual received data is represented by numerical values, and FIG. 13(b) is a configuration diagram of an image in which intensity is changed, depending on the numerical values of FIG. 13(a). FIG. 13(c) is an image configuration diagram in which image data when the process of the present invention is used is represented by numerical values, and FIG. 13(d) is a configuration diagram of an image in which intensity is changed, depending on the numerical values of FIG. 13(c). FIG. 13(e) is an image configuration diagram in which image data when the conventional process is used is represented by numerical values, and FIG. 13(f) is a configuration diagram of an image in which intensity is changed, depending on the numerical values of FIG. 13(e). Note that, in FIG. 13(b), FIG. 13(d), and FIG. 13(f), a higher density of a pixel indicates a higher intensity of the pixel of the pixel. As indicated with these diagrams, whereas solitary real sweep data, such as noise or the like, is emphasized with interpolated sweep data in the conventional radar apparatus, solitary real sweep is not displayed and, in addition, interpolated sweep data corresponding to this real sweep is not displayed in the radar apparatus of the present invention. Thereby, unnecessary noise or the like is prevented from being displayed and, in addition, this noise is prevented from being emphasized and displayed, so that a detection image more viewable for the operator is provided.

Note that, in the above-described embodiment, interpolated sweep data is linearly interpolated values for adjacent pieces of real sweep data between which these interpolated sweeps are interposed. Alternatively, interpolated sweep data may be an average value for adjacent pieces of real sweep data between which these interpolated sweeps are interposed. Alternatively, instead of linear interpolation, interpolated sweep data may be values which are gradually changed between the data values of adjacent real sweeps.

Although solitariness removed real sweep data is used as real sweep azimuth data in the above-described embodiment, real sweep data before the solitariness removing process may be used as real sweep azimuth data.

Although the solitariness removing process is performed in the distance direction in the above-described embodiment, the solitariness removing process may be performed in the azimuth direction.

Although the radar apparatus is described in the above-described embodiment, the above-described constitution can be applied to other devices which can transmit and receive a detection signal in all azimuths and obtain a detection image, and in this case, the above-described effect can be obtained.

INDUSTRIAL APPLICABILITY

The present invention can be applied to a radar apparatus which forms and displays detection image data for all azimuths based on a detection signal received by an antenna.

The invention claimed is:

1. A radar apparatus for forming detection data from real sweep data successively formed based on a detection signal received by an antenna, and interpolated sweep data that is interpolated between adjacent pieces of the real sweep data in an azimuth direction, the device comprising:
    interpolated sweep azimuth calculator for calculating a sweep azimuth of an interpolated sweep formed between a current real sweep and the previous real sweep based on a sweep azimuth of the current real sweep and a sweep azimuth of the previous real sweep, and
    sweep data former for calculating interpolated sweep data between current real sweep data and the previous real sweep data based on the current real sweep data and the previous real sweep data,
    wherein sweep data is formed based on the calculated interpolated sweep data and the real sweep data.

2. The radar apparatus according to claim 1, wherein the interpolated sweep data is composed of a linearly interpolated value between the previous real sweep data and the current real sweep data present on the same position in a sweep distance direction.

3. The radar apparatus according to claim 1 or 2, wherein the sweep data former comprises:
    corrected real sweep data former for, when, among a plurality of pieces of data of the real sweep data arranged in a distance direction, solitary data having a value larger than or equal to a predetermined threshold value is present in a predetermined range, converting the solitary data into corrected real sweep data, and
    corrected interpolated sweep data calculator for calculating corrected interpolated sweep data based on the corrected real sweep data formed by the corrected real sweep data former, and forms the sweep data based on the corrected real sweep data and the corrected interpolated sweep data.

4. A radar apparatus for forming detection image data from real sweep data successively formed based on a detection signal received by an antenna, and interpolated sweep data that is interpolated between adjacent pieces of the real sweep data in an azimuth direction, the device comprising:

corrected real sweep data former for, when, among a plurality of pieces of data of the real sweep data arranged in a distance direction, solitary data having a value larger than or equal to a predetermined threshold value is present in a predetermined range, converting the solitary data into corrected real sweep data, and corrected interpolated sweep data calculator for calculating corrected interpolated sweep data based on the corrected real sweep data formed by the corrected real sweep data former, wherein sweep data is formed based on the corrected real sweep data and the corrected interpolated sweep data.

5. A sweep data forming method for a radar apparatus which forms detection data from real sweep data successively formed based on a detection signal received by an antenna, and interpolated sweep data that is interpolated between adjacent pieces of the real sweep data in an azimuth direction, the method comprising the steps of:

calculating a sweep azimuth of an interpolated sweep formed between a current real sweep and the previous real sweep based on a sweep azimuth of the current real sweep and a sweep azimuth of the previous real sweep, calculating interpolated sweep data between current real sweep data and the previous real sweep data based on the current real sweep data and the previous real sweep data, and forming the sweep data based on the calculated interpolated sweep data, the real sweep data, and the sweep azimuth.

6. A sweep data forming method for a radar apparatus which forms detection data from real sweep data successively formed based on a detection signal received by an antenna, and interpolated sweep data that is interpolated between adjacent pieces of the real sweep data in an azimuth direction, the method comprising the steps of, when, among a plurality of pieces of data of the real sweep data arranged in a distance direction, solitary data having a value larger than or equal to a predetermined threshold value is present in a predetermined range:

converting the solitary data into corrected real sweep data, calculating corrected interpolated sweep data based on the corrected real sweep data, and forming the sweep data based on the corrected real sweep data and the corrected interpolated sweep data.

* * * * *